(12) United States Patent
Sullivan et al.

(10) Patent No.: US 10,981,463 B2
(45) Date of Patent: Apr. 20, 2021

(54) AUTONOMOUS TRANSPORT VEHICLE CHARGING SYSTEM

(71) Applicant: SYMBOTIC, LLC, Wilmington, MA (US)

(72) Inventors: Robert Sullivan, Wilmington, MA (US); Dmitry Vasilyev, Sommerville, MA (US)

(73) Assignee: Symbolic LLC, Wilmington, MA (US)

( * ) Notice: Subject to any disclaimer, the term of this patent is extended or adjusted under 35 U.S.C. 154(b) by 0 days.

(21) Appl. No.: 16/660,076

(22) Filed: Oct. 22, 2019

(65) Prior Publication Data

US 2020/0047635 A1 Feb. 13, 2020

Related U.S. Application Data

(63) Continuation of application No. 16/275,542, filed on Feb. 14, 2019, now Pat. No. 10,449,872, which is a
(Continued)

(51) Int. Cl.
*H02J 7/00* (2006.01)
*B60L 53/63* (2019.01)
(Continued)

(52) U.S. Cl.
CPC .......... *B60L 53/63* (2019.02); *B60G 5/00* (2013.01); *B60L 53/66* (2019.02); *B60S 5/00* (2013.01);
(Continued)

(58) Field of Classification Search
CPC ....................................................... B60L 53/63
(Continued)

(56) References Cited

U.S. PATENT DOCUMENTS 2,945,604 A 7/1960 Kroll et al.
3,016,154 A 1/1962 Ugolini et al.
(Continued)

FOREIGN PATENT DOCUMENTS

DE 2150500 4/1973
EP 2073088 6/2009
(Continued)

OTHER PUBLICATIONS

US 8,290,622 B2, 10/2012, Dooley et al. (withdrawn)
(Continued)

*Primary Examiner* — Yalkew Fantu
(74) *Attorney, Agent, or Firm* — Perman & Green, LLP

(57) ABSTRACT

A charging system for autonomous transport vehicles including at least one charging contact disposed on each pick floor level of a storage and retrieval system, each of the at least one charging contact being located at a transfer station, at least one power supply configured to supply power to the at least one charging contact, and a controller in communication with the transfer station and being configured to communicate information relating to a transfer of items between the transfer station and a predetermined one of the autonomous transport vehicles and to apply power from the power supply to the at least one charging contact for charging the predetermined autonomous transport vehicle corresponding to the transfer and located at the transfer station, wherein the controller is configured to supply power to the charging contacts simultaneously with the predetermined autonomous transport vehicle exchanging items related to the transfer at the transfer station.

21 Claims, 14 Drawing Sheets

Related U.S. Application Data continuation of application No. 15/702,474, filed on Sep. 12, 2017, now Pat. No. 10,207,595, which is a continuation of application No. 15/359,366, filed on Nov. 22, 2016, now Pat. No. 9,758,049, which is a continuation of application No. 14/799,367, filed on Jul. 14, 2015, now Pat. No. 9,499,062, which is a continuation of application No. 13/326,823, filed on Dec. 15, 2011, now Pat. No. 9,082,112.

(60) Provisional application No. 61/423,403, filed on Dec. 15, 2010.

(51) Int. Cl.

| | |
|---|---|
| *G06Q 30/02* | (2012.01) |
| *G06Q 40/00* | (2012.01) |
| *B60L 53/66* | (2019.01) |
| *G06Q 20/10* | (2012.01) |
| *B65G 47/04* | (2006.01) |
| *B65G 67/02* | (2006.01) |
| *B60S 5/00* | (2006.01) |
| *B65G 1/04* | (2006.01) |
| *B65G 1/137* | (2006.01) |
| *B60G 5/00* | (2006.01) |
| *G06Q 10/08* | (2012.01) |

(52) U.S. Cl.
CPC .......... *B65G 1/0492* (2013.01); *B65G 1/1373* (2013.01); *B65G 47/04* (2013.01); *B65G 67/02* (2013.01); *G06Q 20/105* (2013.01); *G06Q 30/0215* (2013.01); *G06Q 40/00* (2013.01); *H02J 7/007* (2013.01); *H02J 7/0021* (2013.01); *G06Q 10/087* (2013.01)

(58) Field of Classification Search
USPC ...................................................... 320/109
See application file for complete search history.

(56) References Cited

U.S. PATENT DOCUMENTS

| | | | |
|---|---|---|---|
| 3,161,303 A | 12/1964 | Burrows | |
| 3,554,390 A | 1/1971 | Sanford | |
| 3,581,915 A | 6/1971 | Sanford | |
| 4,428,708 A | 1/1984 | Burt | |
| 4,777,416 A | 10/1988 | George, III et al. | |
| 4,856,263 A | 8/1989 | Schneider et al. | |
| 4,909,697 A | 3/1990 | Bernard, II et al. | |
| 4,987,992 A | 1/1991 | Pfleger | |
| 5,045,769 A | 9/1991 | Everett, Jr. | |
| 5,220,263 A | 6/1993 | Onishi et al. | |
| 5,273,392 A | 12/1993 | Bernard, II et al. | |
| 5,323,098 A | 6/1994 | Hamaguchi et al. | |
| 5,350,270 A | 9/1994 | Stallard et al. | |
| 5,395,206 A | 3/1995 | Cerny, Jr. | |
| 5,462,439 A | 10/1995 | Keith | |
| 5,509,538 A | 4/1996 | Spindler et al. | |
| 5,565,755 A | 10/1996 | Keith | |
| 5,569,993 A | 10/1996 | Keith | |
| 5,612,606 A | 3/1997 | Guimarin et al. | |
| 5,664,929 A | 9/1997 | Esaki et al. | |
| 5,709,291 A | 1/1998 | Nishino et al. | |
| 5,718,322 A | 2/1998 | Mulhern | |
| 5,847,537 A | 12/1998 | Parmley, Sr. | |
| 6,061,607 A | 5/2000 | Bradley et al. | |
| 6,222,342 B1 | 4/2001 | Eggert et al. | |
| 6,259,228 B1 | 7/2001 | Becker et al. | |
| 6,262,559 B1 | 7/2001 | Eggert et al. | |
| 6,289,260 B1 | 9/2001 | Bradley et al. | |
| 6,325,586 B1 * | 12/2001 | Loy ..................... | B65G 1/02 |
| | | | 414/281 |
| 6,377,867 B1 | 4/2002 | Bradley et al. | |
| 6,394,260 B1 | 5/2002 | Barth et al. | |
| 6,397,990 B1 | 6/2002 | Brien et al. | |
| 6,404,168 B1 | 6/2002 | Shoji | |
| 6,496,755 B2 | 12/2002 | Wallach et al. | |
| 6,597,150 B1 | 7/2003 | Bertness et al. | |
| 6,597,151 B1 | 7/2003 | Price et al. | |
| 6,612,246 B2 | 9/2003 | Kumar | |
| 6,652,213 B1 | 11/2003 | Mitchel et al. | |
| 6,764,373 B1 | 7/2004 | Osawa et al. | |
| 6,836,701 B2 | 12/2004 | McKee | |
| 6,859,682 B2 | 2/2005 | Naka et al. | |
| 6,894,457 B2 | 5/2005 | Germagian et al. | |
| 7,015,674 B2 | 3/2006 | Vonderhaar | |
| 7,054,716 B2 | 5/2006 | McKee et al. | |
| 7,066,291 B2 | 6/2006 | Martins et al. | |
| 7,133,746 B2 | 11/2006 | Abramson et al. | |
| 7,137,593 B2 | 11/2006 | Baatz | |
| 7,224,086 B2 | 5/2007 | Germagian et al. | |
| D557,206 S | 12/2007 | Hussaini et al. | |
| 7,329,081 B2 | 2/2008 | Baker et al. | |
| 7,332,890 B2 | 2/2008 | Cohen et al. | |
| 7,352,153 B2 | 4/2008 | Yan | |
| 7,376,487 B2 | 5/2008 | Kumhyr | |
| 7,397,213 B2 | 7/2008 | Im et al. | |
| 7,460,462 B2 | 12/2008 | Mejia et al. | |
| 7,520,376 B2 | 4/2009 | Bar | |
| 7,532,947 B2 | 5/2009 | Waddington et al. | |
| 7,591,630 B2 | 9/2009 | Lert, Jr. | |
| 7,615,957 B2 | 11/2009 | Kim et al. | |
| 7,653,457 B2 | 1/2010 | Bloom | |
| 7,686,560 B2 | 3/2010 | Laurin et al. | |
| 7,719,229 B2 | 5/2010 | Kaneko | |
| 7,728,549 B2 | 6/2010 | Bartlett et al. | |
| 7,729,801 B2 | 6/2010 | Abramson | |
| 7,825,633 B2 | 11/2010 | Udono | |
| 7,826,920 B2 | 11/2010 | Stevens et al. | |
| 7,834,584 B2 | 11/2010 | Koyanagi et al. | |
| 7,856,290 B2 | 12/2010 | Kumhyr | |
| 7,858,227 B2 | 12/2010 | Song et al. | |
| 7,861,844 B2 | 1/2011 | Hayduchok et al. | |
| 7,880,431 B2 | 2/2011 | Rayl et al. | |
| 7,890,228 B2 | 2/2011 | Redmann, Jr. et al. | |
| 7,894,940 B2 | 2/2011 | Kumhyr | |
| 7,906,937 B2 | 3/2011 | Bhade et al. | |
| 7,941,244 B2 | 5/2011 | Somin et al. | |
| 7,945,798 B2 | 5/2011 | Carlson et al. | |
| 7,991,505 B2 | 8/2011 | Lert, Jr. et al. | |
| 8,004,237 B2 | 8/2011 | Manor et al. | |
| 8,013,570 B2 | 9/2011 | Baxter et al. | |
| 8,024,064 B1 | 9/2011 | Saughavi et al. | |
| 8,027,760 B2 | 9/2011 | Chattot | |
| 8,028,822 B2 | 10/2011 | Braunstein | |
| 8,047,756 B2 | 11/2011 | Tuffs et al. | |
| 8,072,184 B2 | 12/2011 | Bhade et al. | |
| 8,076,900 B1 | 12/2011 | Brown | |
| 8,080,975 B2 | 12/2011 | Bessa et al. | |
| 8,097,356 B2 | 1/2012 | Horikoshi et al. | |
| 8,253,373 B2 | 8/2012 | Manor et al. | |
| 8,288,989 B2 | 10/2012 | Baba | |
| 8,299,750 B2 | 10/2012 | Pai | |
| 8,344,686 B2 | 1/2013 | Gaul et al. | |
| 8,350,526 B2 | 1/2013 | Dyer et al. | |
| 8,354,913 B2 | 1/2013 | Solomon et al. | |
| 8,425,173 B2 | 4/2013 | Lert | |
| 8,594,835 B2 | 11/2013 | Lert | |
| 8,740,538 B2 | 6/2014 | Lert | |
| 8,812,353 B2 | 8/2014 | Redmann et al. | |
| 8,998,554 B2 | 4/2015 | Toebes | |
| 9,051,120 B2 | 6/2015 | Lert et al. | |
| 9,082,112 B2 | 7/2015 | Sullivan et al. | |
| 9,096,375 B2 | 8/2015 | Lert et al. | |
| 9,371,183 B2 | 6/2016 | Toebes | |
| 9,469,208 B2 | 10/2016 | Dorval | |
| 9,475,649 B2 | 10/2016 | Toebes | |
| 9,481,517 B2 | 11/2016 | Sweet | |
| 9,499,062 B2 | 11/2016 | Sullivan | |
| 9,606,541 B2 | 3/2017 | Abramson | |
| 9,694,975 B2 | 7/2017 | Lert | |
| 9,725,239 B2 | 8/2017 | Lert | |

(56) References Cited

U.S. PATENT DOCUMENTS

| | | |
|---|---|---|
| 9,728,991 B2 | 8/2017 | Jagenstedt |
| 9,758,049 B2 | 9/2017 | Sullivan |
| 9,771,217 B2 | 9/2017 | Lert |
| 9,802,761 B2 | 10/2017 | Buzan |
| 9,829,891 B2 | 11/2017 | Smith |
| 9,981,808 B2 | 5/2018 | Sullivan |
| 9,988,213 B2 | 6/2018 | Buzan |
| 10,035,649 B2 | 7/2018 | Lert |
| 10,035,650 B2 | 7/2018 | Sweet |
| 10,207,595 B2 | 2/2019 | Sullivan |
| 10,239,691 B2 | 3/2019 | Lert |
| 10,259,498 B2 | 4/2019 | Jagenstedt |
| 10,442,622 B2 | 10/2019 | Lert |
| 10,449,872 B2 | 10/2019 | Sullivan |
| 10,457,484 B2 | 10/2019 | Buzan |
| 10,556,743 B2 | 2/2020 | Sullivan |
| 10,683,170 B2 | 6/2020 | Buzan |
| 2002/0124389 A1 | 9/2002 | Matson |
| 2003/0151387 A1 | 8/2003 | Kumar |
| 2004/0088081 A1 | 5/2004 | Song et al. |
| 2004/0136821 A1 | 7/2004 | Berger et al. |
| 2004/0238326 A1 | 12/2004 | Lichti |
| 2005/0083011 A1 | 4/2005 | Yang |
| 2005/0212478 A1 | 9/2005 | Takenaka |
| 2005/0231156 A1 | 10/2005 | Yan |
| 2006/0104712 A1 | 5/2006 | Bufano et al. |
| 2007/0114970 A1 | 5/2007 | Johnson |
| 2007/0114975 A1 | 5/2007 | Cohen et al. |
| 2007/0142964 A1 | 6/2007 | Abramson |
| 2007/0216347 A1 | 9/2007 | Kaneko et al. |
| 2007/0267998 A1 | 11/2007 | Cohen et al. |
| 2008/0007203 A1 | 1/2008 | Cohen et al. |
| 2008/0021602 A1 | 1/2008 | Kingham et al. |
| 2008/0025833 A1 | 1/2008 | Baker et al. |
| 2008/0129445 A1 | 6/2008 | Kraimer et al. |
| 2008/0174268 A1 | 7/2008 | Koo et al. |
| 2009/0074545 A1 | 3/2009 | Lert et al. |
| 2009/0133733 A1 | 5/2009 | Retti |
| 2009/0138149 A1* | 5/2009 | Chattot ............... B60L 5/42 701/22 |
| 2009/0284245 A1 | 11/2009 | Kirby et al. |
| 2009/0315501 A1 | 12/2009 | Li et al. |
| 2010/0031670 A1 | 2/2010 | Lert |
| 2010/0131182 A1 | 5/2010 | Deegan et al. |
| 2010/0145507 A1 | 6/2010 | Blust et al. |
| 2010/0277005 A1 | 11/2010 | Karalis et al. |
| 2010/0277121 A1 | 11/2010 | Hall et al. |
| 2010/0308939 A1 | 12/2010 | Kurs |
| 2010/0316468 A1 | 12/2010 | Lert |
| 2010/0316469 A1 | 12/2010 | Lert |
| 2010/0322746 A1 | 12/2010 | Lert |
| 2010/0322747 A1* | 12/2010 | Lert ............... B65G 1/10 414/273 |
| 2011/0058926 A1 | 3/2011 | Winker |
| 2011/0082583 A1 | 4/2011 | Kumbyr |
| 2011/0083578 A1 | 4/2011 | Sami |
| 2011/0089891 A1 | 4/2011 | Pai |
| 2011/0093314 A1 | 4/2011 | Redmann et al. |
| 2011/0106295 A1 | 5/2011 | Miranda et al. |
| 2011/0118903 A1 | 5/2011 | Kraimer et al. |
| 2011/0130875 A1 | 6/2011 | Abramson |
| 2011/0148364 A1 | 6/2011 | Ota |
| 2011/0216185 A1 | 9/2011 | Laws et al. |
| 2011/0234153 A1 | 9/2011 | Abramson |
| 2011/0238206 A1 | 9/2011 | Somin et al. |
| 2011/0241845 A1* | 10/2011 | Sullivan ............ H01L 21/67294 340/10.42 |
| 2011/0246252 A1 | 10/2011 | Uesugi |
| 2011/0254503 A1 | 10/2011 | Widmer et al. |
| 2011/0285349 A1 | 11/2011 | Widmer et al. |
| 2012/0045303 A1 | 2/2012 | Macdonald |
| 2012/0186192 A1 | 7/2012 | Toebes |
| 2012/0186942 A1 | 7/2012 | Toebes |
| 2012/0191517 A1 | 7/2012 | Daffin, Jr. |
| 2012/0200256 A1 | 8/2012 | Tse |
| 2012/0200259 A1 | 8/2012 | Sullivan et al. |
| 2012/0235477 A1 | 9/2012 | Korman |
| 2012/0293109 A1 | 11/2012 | Glazer |
| 2013/0043826 A1 | 2/2013 | Workman et al. |
| 2013/0127415 A1 | 5/2013 | Ohtomo |
| 2013/0304342 A1 | 11/2013 | Kumar |
| 2014/0031979 A1 | 1/2014 | Borinato et al. |
| 2014/0088758 A1 | 3/2014 | Lert |
| 2014/0013225 A1 | 5/2014 | Jagenstedt |
| 2014/0271063 A1 | 9/2014 | Lert |
| 2014/0277692 A1 | 9/2014 | Buzan |
| 2014/0312838 A1 | 10/2014 | Dorval et al. |
| 2014/0320319 A1 | 10/2014 | Redmann et al. |
| 2014/0343716 A1 | 11/2014 | Sweet |
| 2014/0343717 A1 | 11/2014 | Dorval et al. |
| 2015/0239665 A1 | 8/2015 | Toebes |
| 2015/0266672 A1 | 9/2015 | Lert et al. |
| 2016/0031337 A1 | 2/2016 | Li et al. |
| 2016/0180711 A1 | 6/2016 | Redmann et al. |
| 2016/0185245 A1 | 6/2016 | Sullivan |
| 2016/0185526 A1 | 6/2016 | Lert et al. |
| 2017/0043952 A1 | 2/2017 | Sweet |
| 2017/0072809 A1 | 3/2017 | Sullivan |
| 2017/0101274 A1 | 4/2017 | Sullivan |
| 2017/0362032 A1 | 12/2017 | Sullivan |
| 2018/0001778 A1 | 1/2018 | Sullivan |
| 2018/0016098 A1 | 1/2018 | Lert |
| 2018/0127210 A1 | 5/2018 | Buzan |
| 2018/0273306 A1 | 9/2018 | Sullivan |
| 2018/0282064 A1 | 10/2018 | Buzan |
| 2018/0334325 A1 | 11/2018 | Lert |
| 2018/0334326 A1 | 11/2018 | Sweet |
| 2019/0176655 A1 | 6/2019 | Sullivan |
| 2019/0218034 A1 | 7/2019 | Caveney |
| 2020/0039744 A1 | 2/2020 | Lert |
| 2020/0047635 A1 | 2/2020 | Sullivan |
| 2020/0062504 A1 | 2/2020 | Buzan |
| 2020/0172336 A1 | 6/2020 | Sullivan |

FOREIGN PATENT DOCUMENTS

| | | |
|---|---|---|
| EP | 2658073 | 10/2013 |
| WO | 2012083589 | 6/2012 |
| WO | 2012119853 | 9/2012 |
| WO | 2012177193 | 12/2012 |

OTHER PUBLICATIONS

"Robot that seeks out and connects to recharge station," crOsh, Arduino, Published Mar. 23, 2011, Accessed Online Apr. 5, 2016, http://forum.arduino.cc/index.php?topic=56250.0.

"Third Rail," RailSystem.net, published on Google Aug. 4, 2009, Accessed Feb. 1, 2018, http://www.railsystem.net/third-rail/.

* cited by examiner

TYPICAL CHARGE CYCLE

AUTONOMOUS TRANSPORT VEHICLE CHARGING SYSTEM

CROSS-REFERENCE TO RELATED APPLICATIONS

This application is a continuation of U.S. Non-Provisional patent application Ser. No. 16/275,542, filed on Feb. 14, 2019, which is a continuation of U.S. Non-Provisional patent application Ser. No. 15/702,474, filed on Sep. 12, 2017 (now U.S. Pat. No. 10,207,595), which is a continuation of U.S. Non-Provisional patent application Ser. No. 15/359,366, filed on Nov. 22, 2016 (now U.S. Pat. No. 9,758,049), which is a continuation of U.S. Non-Provisional patent application Ser. No. 14/799,367, filed on Jul. 14, 2015 (now U.S. Pat. No. 9,499,062), which is a continuation of U.S. Non-Provisional patent application Ser. No. 13/326,823, filed on Dec. 15, 2011 (now U.S. Pat. No. 9,082,112) which claims the benefit of and priority from U.S. Provisional Patent Application No. 61/423,402, filed on Dec. 15, 2010, the disclosures of which are incorporated herein by reference in their entireties.

BACKGROUND

1. Field

The embodiments generally relate to storage and retrieval systems and, more particularly, to autonomous transports of the storage and retrieval systems.

2. Brief Description of Related Developments

Warehouses for storing case units may generally comprise a series of storage racks that are accessible by transport devices such as, for example, fork lifts, carts and elevators that are movable within aisles between or along the storage racks or by other lifting and transporting devices. These transport devices may be automated or manually driven. Generally the items transported to/from and stored on the storage racks are contained in carriers, for example storage containers such as trays, totes or shipping cases, or on pallets.

It would be advantageous for the automated transport vehicle to operate at substantially full utility while transporting items throughout the storage and retrieval system.

BRIEF DESCRIPTION OF THE DRAWINGS

The foregoing aspects and other features of the disclosed embodiments are explained in the following description, taken in connection with the accompanying drawings, wherein.

DETAILED DESCRIPTION OF THE EXEMPLARY EMBODIMENT(S)

Figure 1:
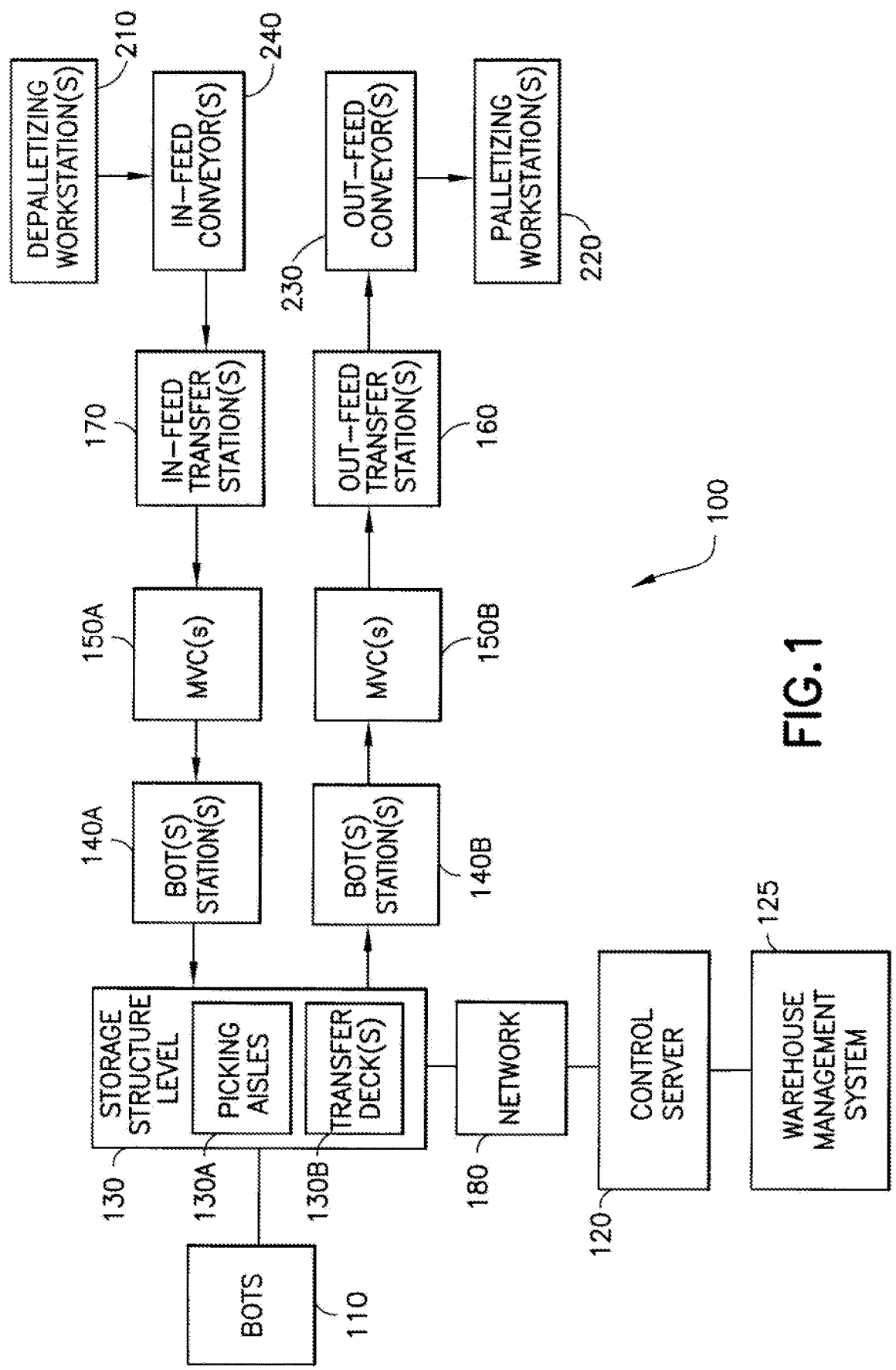
FIG. 1 schematically illustrates an exemplary storage and retrieval system in accordance with the embodiments.

FIG. 1 schematically illustrates an exemplary storage and retrieval system 100 in accordance with the embodiments. Although the disclosed embodiments will be described with reference to the embodiments shown in the drawings, it should be understood that the disclosed embodiments can be embodied in many alternate forms. In addition, any suitable size, shape or type of elements or materials could be used.

In accordance with the embodiments the storage and retrieval system 100 may operate in a retail distribution center or warehouse to, for example, fulfill orders received from retail stores for case units (where case units as used herein means items not stored in trays, on totes or on pallets, e.g. uncontained or items stored in trays totes or on pallets). It is noted that the case units may include cases of items (e.g. case of soup cans, boxes of cereal, etc.) or individual items that are adapted to be taken off of or placed on a pallet. In accordance with the embodiments, shipping cases or case units (e.g. cartons, barrels, boxes, crates, jugs, totes, pallets or any other suitable device for holding case units) may have variable sizes and may be used to hold items in shipping and may be configured so they are capable of being palletized for shipping. It is noted that when, for example, bundles or pallets of case units arrive at the storage and retrieval system the content of each pallet may be uniform (e.g. each pallet holds a predetermined number of the same item—one pallet holds soup and another pallet holds cereal) and as pallets leave the storage and retrieval system the pallets may contain any suitable number and combination of different items (e.g. each pallet may hold different types of items—a pallet holds a combination of soup and cereal). In the embodiments the storage and retrieval system described herein may be applied to any environment in which case units are stored and retrieved.

The storage and retrieval system 100 may be configured for installation in, for example, existing warehouse structures or adapted to new warehouse structures. In the embodiments, the storage and retrieval system may include in-feed and out-feed transfer stations 170, 160, multilevel vertical conveyors 150A, 150B, autonomous transport vehicle or robot (referred to herein as "bots") stations 140A, 140B, a storage structure 130, and a number of bots 110. Suitable examples of storage and retrieval systems may be found in U.S. patent application Ser. No. 12/757,220, entitled "STORAGE AND RETRIEVAL SYSTEM" and filed on Apr. 9, 2010 and U.S. patent application Ser. No. 12/757,381, entitled "STORAGE AND RETRIEVAL SYSTEM" and filed on Apr. 9, 2010, and U.S. Provisional Patent Application Ser. No. 61/423,340 entitled "Warehousing Scalable Storage Structure" filed on Dec. 15, 2010 (now U.S. patent application Ser. No. 13/326,674 filed on Dec. 15, 2011), the disclosures of which are incorporated by reference herein in their entireties. The in-feed transfer stations 170 and out-feed transfer stations 160 may operate together with their respective multilevel vertical conveyors 150A, 150B for bi-directionally transferring case units to and from one or more levels of the storage structure 130. It is noted that while the multilevel vertical conveyors 150 are described herein as being dedicated inbound or in-feed conveyors 150A and outbound or out-feed conveyors 150B, each of the conveyors 150A, 150B may be used for both inbound and outbound transfer of case units/items from the storage and retrieval system. The multilevel vertical conveyors 150 may be any suitable lifting devices for transporting case units between levels of the storage and retrieval system. Some non-limiting suitable examples of multilevel vertical conveyors can be found in, for example, U.S. Provisional Patent Application No. 61/423,298, entitled "MULTILEVEL VERTICAL CONVEYOR PLATFORM GUIDES" filed on Dec. 15, 2010, and U.S. patent application Ser. No. 12/757,354, entitled "LIFT INTERFACE FOR STORAGE AND RETRIEVAL SYSTEMS" and filed on Apr. 9, 2010 (the disclosures of which are incorporated by reference herein in their entireties) and U.S. patent application Ser. No. 12/757,220, entitled "STORAGE AND RETRIEVAL SYSTEM," (previously incorporated by reference). For example, the multilevel vertical conveyors 150A, 150B may have any suitable number of support shelves 250 (FIG. 2) for transporting the case units to a predetermined level 261-264 (FIG. 2) of the storage and retrieval system 100. The support shelves 250 may have slatted supports configured to allow, for example, fingers of a transfer arm 110A (FIGS. 2A, 2B) of the bots 110 to pass between the slats for transferring case units 101 (FIG. 2) to and from the conveyor. In alternate embodiments, case units may be indirectly transferred between the bots 110 and the multilevel vertical conveyors 150A, 150B as described in, for example, U.S. patent application Ser. No. 12/757,220, entitled "STORAGE AND RETRIEVAL SYSTEM," (previously incorporated by reference). It is noted that in the embodiments transfer of case units between the bots 110 and multilevel vertical conveyors may occur in any suitable manner.

As may be realized, the storage and retrieval system 100 may include multiple in-feed and out-feed multilevel vertical conveyors 150A, 150B that are accessible by, for example, bots 110 on each level of the storage and retrieval system 100 so that one or more case unit(s) can be transferred from a multilevel vertical conveyor 150A, 150B to each storage space on a respective level and from each storage space to any one of the multilevel vertical conveyors 150A, 150B on a respective level. The bots 110 may be configured to transfer the case units between the storage spaces on storage racks 600 (FIG. 2B) and the multilevel vertical conveyors with one pick (e.g. substantially directly between the storage spaces and the multilevel vertical conveyors). By way of further example, the designated bot 110 picks the case unit(s) from a shelf of a multilevel vertical conveyor, transports the case unit(s) to a predetermined storage area of the storage structure 130 and places the case unit(s) in the predetermined storage area (and vice versa). It is noted that while multilevel vertical conveyors are described herein in other aspects the conveyors may be any suitable conveyors or transfer/picking devices having any suitable transport path orientation.

The bots 110 may be configured to place case units, such as the above described retail merchandise, into picking stock in the one or more levels of the storage structure 130 and then selectively retrieve ordered items for shipping the ordered items to, for example, a store or other suitable location. As described above, the bots 110 may interface in any suitable manner with the multilevel vertical conveyors 150A, 150B such as through, for example, extension of a transfer arm 110A (FIG. 2A) of the bot (which may have fingers for interfacing with slatted support shelves of the multi-level vertical conveyors) relative to a frame of the bot. In the embodiments the bot may also interface with the multilevel vertical conveyors indirectly in any other suitable manner. Suitable examples of bots are described in U.S. patent application Ser. No. 12/757,312, entitled "AUTONOMOUS TRANSPORTS FOR STORAGE AND RETRIEVAL SYSTEMS" and filed on Apr. 9, 2010, U.S. Provisional Patent Application Ser. No. 61/423,220 entitled "BOT PAYLOAD ALIGNMENT AND SENSING" filed on Dec. 15, 2010 (now U.S. patent application Ser. No. 13/327,040 filed on Dec. 15, 2011), U.S. Provisional Patent Application Ser. No. 61/423,365 entitled "AUTOMATED BOT WITH TRANSFER ARM" filed on Dec. 15, 2010 (now U.S. patent application Ser. No. 13/326,952 filed on Dec. 15, 2011), U.S. Provisional Patent Application Ser. No. 61/423,388 entitled "AUTOMATED BOT TRANSFER ARM DRIVE SYSTEM" filed on Dec. 15, 2010 (now U.S. patent application Ser. No. 13/326,993 filed on Dec. 15, 2011), U.S. Provisional Patent Application Ser. No. 61/423,359 entitled "BOT HAVING HIGH SPEED STABILITY" filed on Dec. 15, 2010 (now U.S. Pat. No. 8,965,619 issued on Feb. 24, 2015), and U.S. Provisional Patent Application Ser. No. 61/423,206 entitled "BOT POSITION SENSING" filed on Dec. 15, 2010 (now U.S. patent application Ser. No. 13/327,035 filed on Dec. 15, 2011), the disclosures of which are incorporated by reference herein in their entireties.

The storage structure 130 may include multiple levels of storage rack modules 600 (FIG. 2B) where each level includes an array of storage spaces (arrayed on the multiple levels and in multiple rows on each level), picking aisles 130A formed between the rows of storage spaces, and transfer decks 130B. In the embodiments, the picking aisles 130A and transfer decks 130B may be arranged for allowing the bots 110 to traverse respective levels of the storage structure 130 for placing case units into picking stock and to retrieve the ordered case units. As may be realized, the storage and retrieval system may be configured to allow random accessibility to the storage spaces. For example, all storage spaces in the storage structure 130 may be treated substantially equally when determining which storage spaces are to be used when picking and placing case units from/to the storage structure 130 such that any storage space of sufficient size can be used to store items. The storage structure 130 may also be arranged such that there is no vertical or horizontal array partitioning of the storage structure. For example, each multilevel vertical conveyor 150A, 150B is common to all storage spaces (e.g. the array of storage spaces) in the storage structure 130 such that any bot 110 can access each storage space and any multilevel vertical conveyor 150A, 150B can receive case units from any storage space on any level so that the multiple levels in the array of storage spaces substantially act as a single level (e.g. no vertical partitioning). The multilevel vertical conveyors 150A, 150B can also receive case units from any storage space on any level of the storage structure 130 (e.g. no horizontal partitioning). It is noted that in the embodiments the storage and retrieval system may be configured so that each multilevel vertical conveyor serves a predetermined area of the array of storage spaces. Suitable exemplary configurations of storage and retrieval systems can be found in, for example, U.S. patent application Ser. No. 12/757,381, entitled "STORAGE AND RETRIEVAL SYSTEM" and filed on Apr. 9, 2010, the disclosure of which is incorporated by reference herein in its entirety.

The storage structure 130 may also include charging stations 290 for replenishing, for example, a battery pack, capacitor, ultra-capacitor or other electricity storage device of the bots 110 as will be described in greater detail below. The charging stations 290 may be located at, for example, bot stations 140A, 140B (generally 140) of the transfer deck 130B so that the bots 110 can substantially simultaneously transfer items, for example, to and from a multilevel vertical conveyor 150A, 150B while being charged. The bots 110 and other suitable features of the storage and retrieval system 100 may be controlled by, for example, one or more central system control computers (e.g. control server) 120 through, for example, any suitable network 180. The network 180 may be a wired network, a wireless network or a combination of a wireless and wired network using any suitable type and/or number of communication protocols. It is noted that, the system control server 120 may be configured to manage and coordinate the overall operation of the storage and retrieval system 100 and interface with, for example, a warehouse management system 125, which in turn manages the warehouse facility as a whole. The control server 120 may be substantially similar to that described in, for example, U.S. patent application Ser. No. 12/757,337, entitled "CONTROL SYSTEM FOR STORAGE AND RETRIEVAL SYSTEMS" and filed on Apr. 9, 2010, the disclosure of which is incorporated by reference herein in its entirety.

Figure 2A:
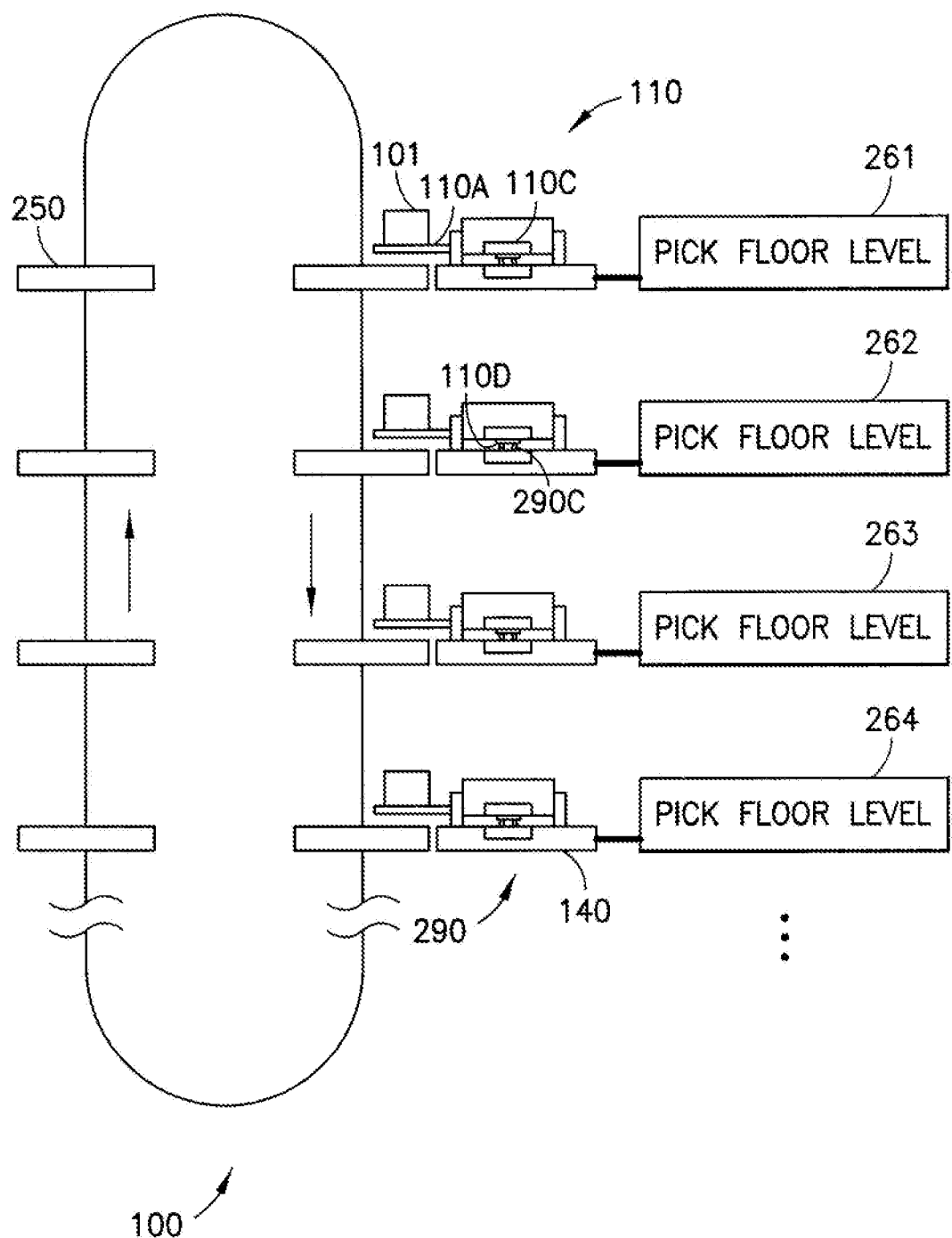
FIG. 2A illustrates a schematic view of a portion of the storage and retrieval system of FIG. 1 in accordance with the embodiments.
Figure 2B:
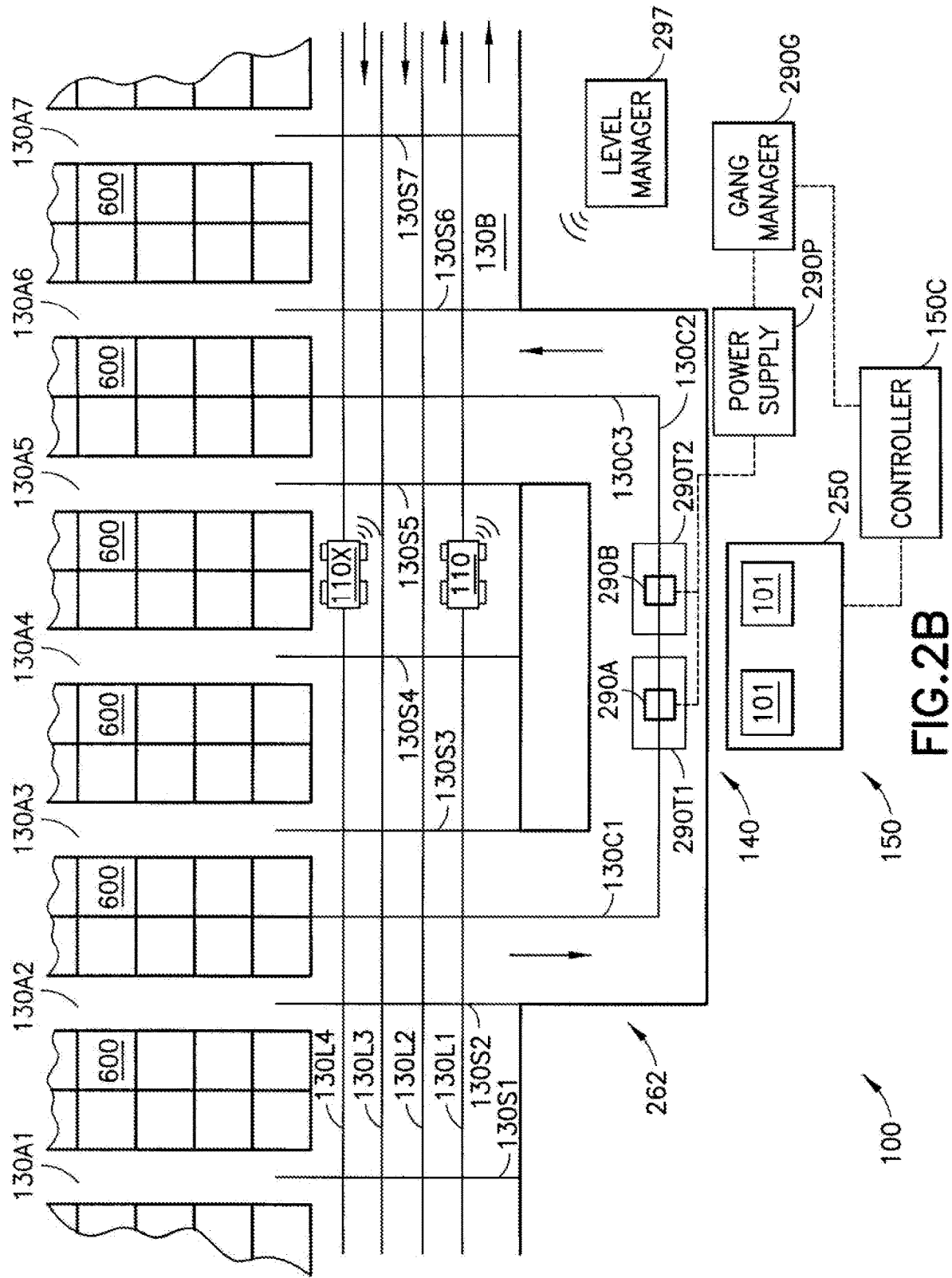
FIG. 2B is another schematic illustration of a portion of the storage and retrieval system of FIG. 1 in accordance with the embodiments.

Referring now to FIGS. 2A and 2B, each of the bots 110 in the storage and retrieval system 100 include one or more suitable electricity storage devices for powering the bot 110. In the embodiments the one or more electricity storage devices may be one or more suitable capacitors or ultra-capacitors (referred to herein generally as capacitor 110C). While the embodiments are described with respect to capacitors it should be understood that the electrical storage devices, in alternate embodiments, may be any suitable solid state, chemical, or other electricity storage system. Still, the bots may be powered by fossil fuels the replenishing of which may be substantially similar to that described herein.

To enable substantially full (about 100%) bot utility during normal operation (e.g. when the bot is actively transferring items in the storage and retrieval system) or during extended idle time, the bots on each storage level 261-264 of the storage and retrieval system 100 may recharge or replenish their power supplies, such as the one or more capacitors 110C, at charging locations or stations 290 at the multilevel vertical conveyor 150 exchange areas (e.g. bot/transfer stations 140). The bots may access the bot stations 140 by, for example, following lines or other suitable guides, such as conveyor access guide lines 130C1-130C3 on the transfer deck 130B. For example, the transfer deck 130B may have any suitable number of travel guide lines 130L1-130L4 and any suitable number of shunt or bypass guide lines 130S1-130S7 that form one or more travel paths or lanes for the bots 110 to traverse. For example, guide lines 130L1, 130L2 allow travel in a first direction and guide lines 130L3, 130L4 allow travel in a second direction substantially opposite the first direction. The shunt guide lines 130S1-130S7 may be oriented substantially transverse to the travel guide lines 130L1-130L4 but in other aspects they may have any suitable orientation relative to the travel guide lines. The shunt guide lines 130S1-130S7 allow bidirectional travel of the bots 110 for switching between travel guide lines 130L1-130L4 so that the bots can access, for example, the picking aisles 130A or the bot stations 140 without traversing an entire length of the travel guide lines 130L1-130L4. In the embodiments, the shunt guide lines may be aligned with the picking aisles 130A1-130A7 or any other suitable ingress or egress location of the storage and retrieval system allowing the bot to turn down a corresponding picking aisle while travelling along any one of the travel guide lines 130L1-130L4. The shunt guide lines 130S1-130S7 may also be located at ends of the transfer deck 130B or at any other suitable locations of the transfer deck 130B. As an example, a bot 110 travelling along a path corresponding to guide line 130L1 may be instructed to transfer an item to a storage location in picking aisle 130A4. However, the bot 110 may have already passed the shunt guide line 130S4 corresponding to picking aisle 130A4. The bot may continue to travel along guide line 130L1 until it encounters the next available shunt (e.g. a shunt not being used by another bot) such as shunt guide line 130S5. The bot may turn onto shunt guide line 130S5 and then turn onto one of the guide lines 130L3, 130L4 so that the bot 110 is travelling in substantially the opposite direction towards the picking aisle 130A4. The bot may continue to travel along one of the guide lines 130L3, 130L4 until it encounters shunt guide line 130S4, corresponding to picking aisle 130A4, where the bot turns onto shunt guide line 130S4 for transitioning into or otherwise entering the picking aisle 130A4 guide way (such as, for example, a rail guidance system). The conveyor access guide lines 130C1-130C3 may be substantially similar to the shunt guide lines 130S1-130S2 however, in the embodiments the conveyor access guide lines may only allow unidirectional travel of the bots 110 through the bot station 140. For example, conveyor access guide line 130C1 may provide an entrance path into the bot station. Conveyor access guide line 130C2 may provide a pathway for charging the bots 110 and allowing the bots to interface with the multilevel vertical conveyor shelves 250. Conveyor access guide line 130C3 may provide an exit path into the bot station. The conveyor access guide lines 130C1-130C3 may also provide bidirectional travel of the bots so that the bots 110 can enter and/or leave the bot station using either of guide lines 130C1 or 130C3. The conveyor access guide lines 130C1, 130C3 may extend across the transfer deck 130B so that the bots can access the bot station 140 from any one of the travel guide lines 130L1-130L4 and exit onto any one of the travel guide lines 130L1-130L4 from the bot station 140. It is noted that while the embodiments of the transfer deck 130B and bot stations 140 are described herein with respect to line following, the transfer deck 130B and bot stations 140 may be configured so that the bots are guided by any suitable rail system. In one example, the bots 110 may enter and exit the picking aisles 130A and the bot stations 140 with either a front end of the bot leading the direction of travel or a back end of the bot leading the direction of travel as described in for example, U.S. Provisional Patent Application Ser. No. 61/423,409 entitled "AUTONOMOUS TRANSPORT VEHICLE" filed on Dec. 15, 2010 (now U.S. patent application Ser. No. 13/326,423 filed on Dec. 15, 2011), the disclosures of which are incorporated herein by reference in their entireties.

In the embodiments, the travel guide lines 130L1-130L4 and shunt guide lines 130S1-130S7 (including guide lines 130C1, 130C3) are arranged so that the bots 110 travel in a substantially counterclockwise direction but it should be realized that the guide lines may be arranged so that the bots travel in a substantially clockwise direction. When traversing the guide lines 130L1-130L4, 130S1-130S7 collisions between the bots 110 may be avoided in any suitable manner such as through bot-to-bot communications or bot location tracking and management through, for example, control server 120 or other suitable bot controller. A suitable example, of bot collision avoidance may be found in, for example, U.S. patent application Ser. No. 12/257,337 entitled "CONTROL SYSTEM FOR STORAGE AND RETRIEVAL SYSTEMS" and filed on Apr. 9, 2010, the disclosure of which is incorporated by reference herein in its entirety.

In the embodiments the bot station 140 may be in the form of a vestibule 130V that extends between the transfer deck 130B and the multilevel vertical conveyor 150. Each vestibule 130V may be configured with more than one charging station 290A, 290B (each of which may also serve as a transfer location for accessing a respective portion of the multilevel vertical conveyor shelf 250) arranged in, for example, a linear array, along guide line 130C2. In this example, there are two charging stations 290A, 290B corresponding with two item holding locations on the multilevel vertical conveyor shelf 250. It is noted that in the embodiments there may be any suitable number of charging stations, which may correspond with a respective number of item holding locations on the multilevel vertical conveyor storage shelf 250.

The charging stations 290A, 290B of each vestibule 130V may be connected to a common power supply 290P as will be described in greater detail below. The common power supply 290P may power the charging stations 290 of multiple bot stations 140. For example, the bot stations 140 may be disposed one above the other in a vertical array or stack so that the bots 110 of each pick floor level 261-264 travel along substantially parallel paths while in the bot stations 140. The storage and retrieval system may include one or more power supplies 290P each of which may be connected to the charging stations 290 of one or more pick floor levels 261-264. Bot 110 ingress and egress to/from the vestibule 130V of the bot station 140 and to the charging stations 290 along, for example, the guide line 130C2 may be synchronized with other bots 110 destined for, leaving, or charging at the charging stations 290 by an access-charge-depart protocol, hosted in any suitable controller of the storage and retrieval system, to maximize substantially full utility of all charging stations 290 of a given vestibule 130V (e.g. to substantially avoid a case where the charging of bots 110 interferes with the ingress/egress process or other bots 110 designated to travel to the same vestibule 130V). Each multilevel vertical conveyor may have any suitable controller 150C, such as a programmable logic controller, for controlling the operations of the respective multilevel vertical conveyor 150 as well as controlling the power supply or supplies of the charging stations 290 disposed on the vestibules 130V providing access to the shelves 250 of the respective multilevel vertical conveyor 150.

Figure 10:
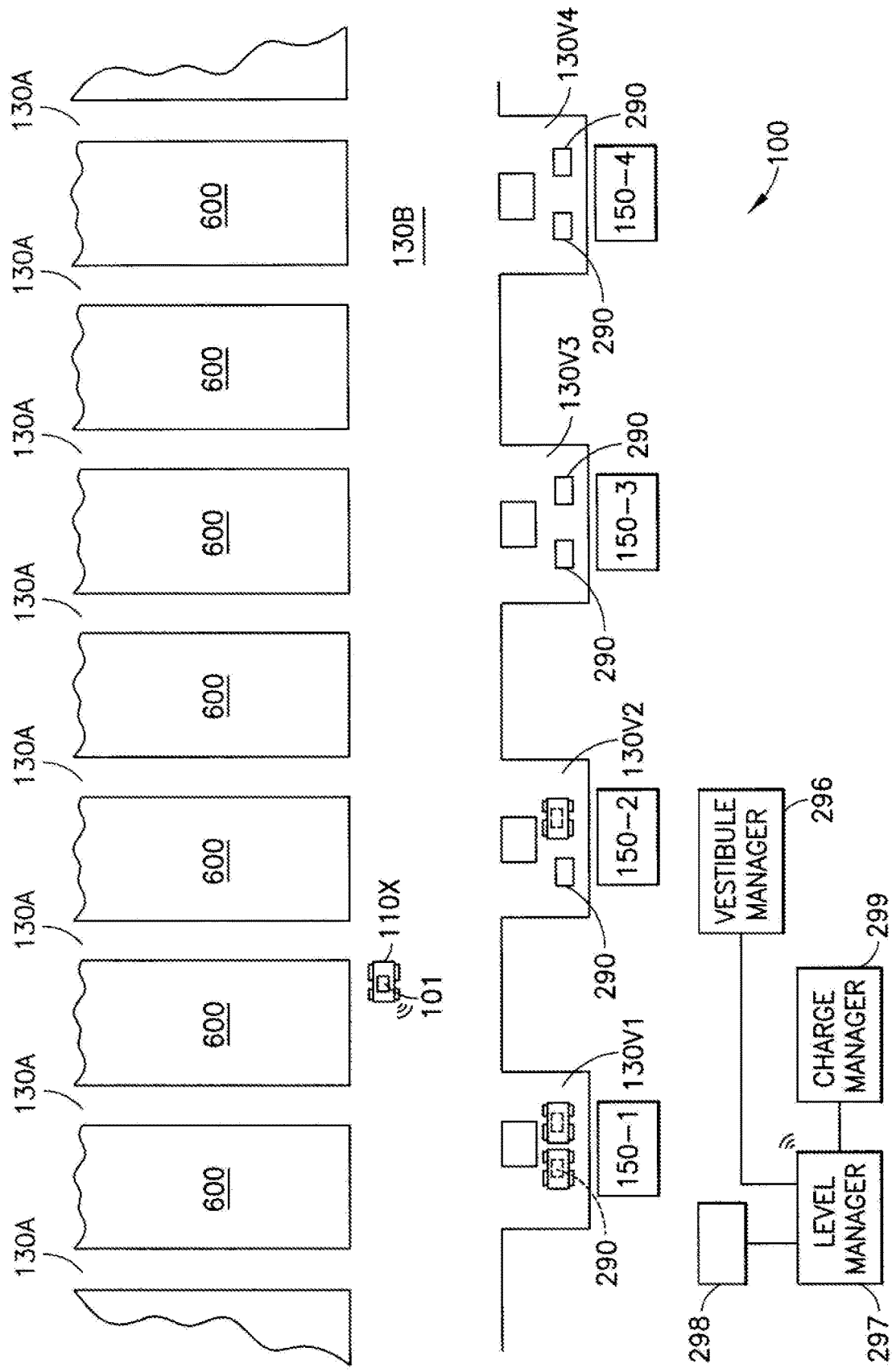
FIG. 10 illustrates a schematic view of a portion of a storage and retrieval system in accordance with the embodiments.

The ingress and egress of the bots 110 to the vestibules 130V may be managed by, for example a level manager 297 a portion of which may include a vestibule manager 296 (FIG. 10). The level manager 297 may have any suitable organization so as to, for example, manage bot operations on one or more pick floor levels, in one or more stacks of bot stations 140 (e.g. bot stations 140 located one above the other), or in geographical regions of the storage and retrieval system. The level manager 297 may be in communication with the bots 110 in any suitable manner using any suitable communication protocol. For example the communication between the bots 110 and the level manager 297 may be a wired or wireless bidirectional and/or unidirectional communications, Linux based communications, etc. In the embodiments each pick floor level 261-264 may have its own respective level manager 297 for controlling or otherwise managing movement of the bots 110 on the respective level and/or, one level manager may manage more than one pick floor level 261-264. The level manager 297 may be configured such that it tracks the location of operative bot charging stations 290 and communicates with a gang manager 290G (FIG. 2B—described below) for obtaining access to the chargers and the status of bot 110 charges. The vestibule manager 296 may manage the areas in which the charging stations 290 are located for determining if access is available before, for example, the gang manager 290G requests access to the charging stations. As will be described below, if one or more charging station 290 in a vestibule is inoperative the vestibule manager 296 may, in the embodiments, close the vestibule (e.g. deny access so that bots are directed to other vestibules) with the inoperative charging station(s) 290.

Each bot 110, through any suitable onboard controller or manager, may communicate with the level manager to effect a charge cycle on the bot 110 in combination with a case unit 101 exchange with a multilevel vertical conveyor 150 on the pick floor level 261-264 on which the bot 110 is located. Each charging station 290A, 290B includes contacts 290C for interfacing with corresponding contacts 110D (e.g. such as a charger pad) on the bot 110 for charging, for example, the bot's capacitor(s) 110C. The contacts 290C may be any suitable contacts such as spring loaded or other actuable contacts that are configured to engage the contacts 110D of the bot 110 when the bot is positioned substantially over the charging station 290A, 290B. These charging station contacts 290C may be positioned at the charging stations 290A, 290B such that they interface with the contacts 110D of a bot 110 when the bot 110 is positioned for interface and exchange with one of the holding locations of the multilevel vertical conveyor shelf 250. As described above the bots access the vestibules 130V of the bot stations 140 through an access-charge-depart protocol that may include getting permission to travel on to the charger contacts 290C (prior to item exchange with the multilevel vertical conveyor), initiating charge, and getting permission to leave (after item exchange with the multilevel vertical conveyor). The level manager 297 may be configured to manage the requests for access to the vestibules 130V and charging stations 290A, 290B and make decisions on whether to allow bots 110 to enter, leave and initiate/terminate charging accordingly. A charge can be initiated once the bot 110 has gained access and stops on one of the charging stations 290A, 290B corresponding to a location on the shelf 250 the bot 110 is to pick/place an item. The charging of the bot 110 may occur during the time it takes to transfer an item between the bot 110 and the shelf 250 or after the transfer has completed. In addition, the bot 110 may charge at the nearest available (e.g. unallocated) vestibule 130V without interfering with other transfers (non-determinative, opportunity charging).

In the embodiments, the bots 110 may perform a quick charge before leaving the multilevel vertical conveyor vestibule 130V, at which point the multilevel vertical conveyor controller 150C may inform a gang manager 290G (FIG. 2B) that a quick charge has been achieved. The quick charge of the bot 110 may be a charge that terminates (or signals ready for termination) at the point where the power supply 290P switches from a constant current mode (e.g. the power supply is delivering maximum current output with variable voltage) to a constant voltage mode (e.g. where the power supply has reached the maximum voltage output set point with a variable current). It is noted that the bot 110 may remain at the charging station 290A, 290B and continue to charge (e.g. to achieve a top off or full charge) until, for example the control server 120 or other suitable controller of the storage and retrieval system deems necessary to move the bot 110, such as to allow another bot 110 access to the charging stations 290A, 290B.

During a quick charge the capacitor 110C of the bot 110 may be at a voltage that does not take into account losses from the power supply 290P to the capacitor 110C. During a top off or full charge the extended period for the capacitor to reach the applied voltage level (Tau=R*C, 5*Tau≈99.3% of final voltage, where R is the combined ESR of the capacitor and any resistance between the power supply sense lines (FIG. 3) and the capacitor). The gang manager 290G may be a collection of cooperating interfaces that manages gang charging of bots 110 (e.g. charging more than one bot at a time where a gang is a group of bots that are charged by the same power supply) on multiple pick floor levels 261-264 that share a power supply. In the embodiments there may be one gang manager 290G per power supply 290 or each gang manager may serve multiple power supplies. In the embodiments, the bots 110 may not have access to a charging station 290 if the power supply 290P is enabled and operational (e.g. power is being transferred to the charging station waiting to be accessed). In the embodiments, after charging and the power supply 290P stops transmitting power to the charging station 290 the gang manager 290G, for example, may cause the bot 110 to remain at the charging station 290 for a predetermined amount of time, which in one example, may be about 280 milliseconds. In other examples, the amount of time the bot 110 remains at the charging station 290 after the power is turned off may be any suitable time period.

Figure 3:
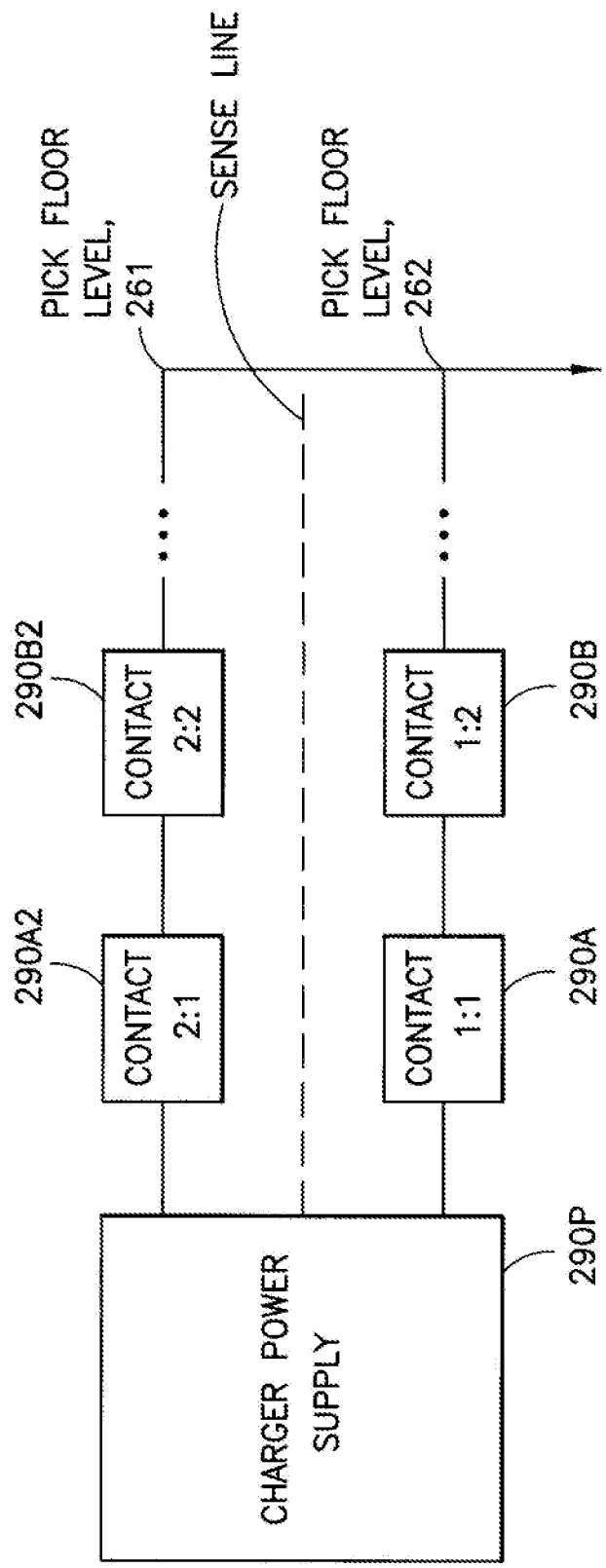
FIG. 3 illustrates a schematic view of a portion of an autonomous transport vehicle charging system in accordance with the embodiments.
Figure 4:
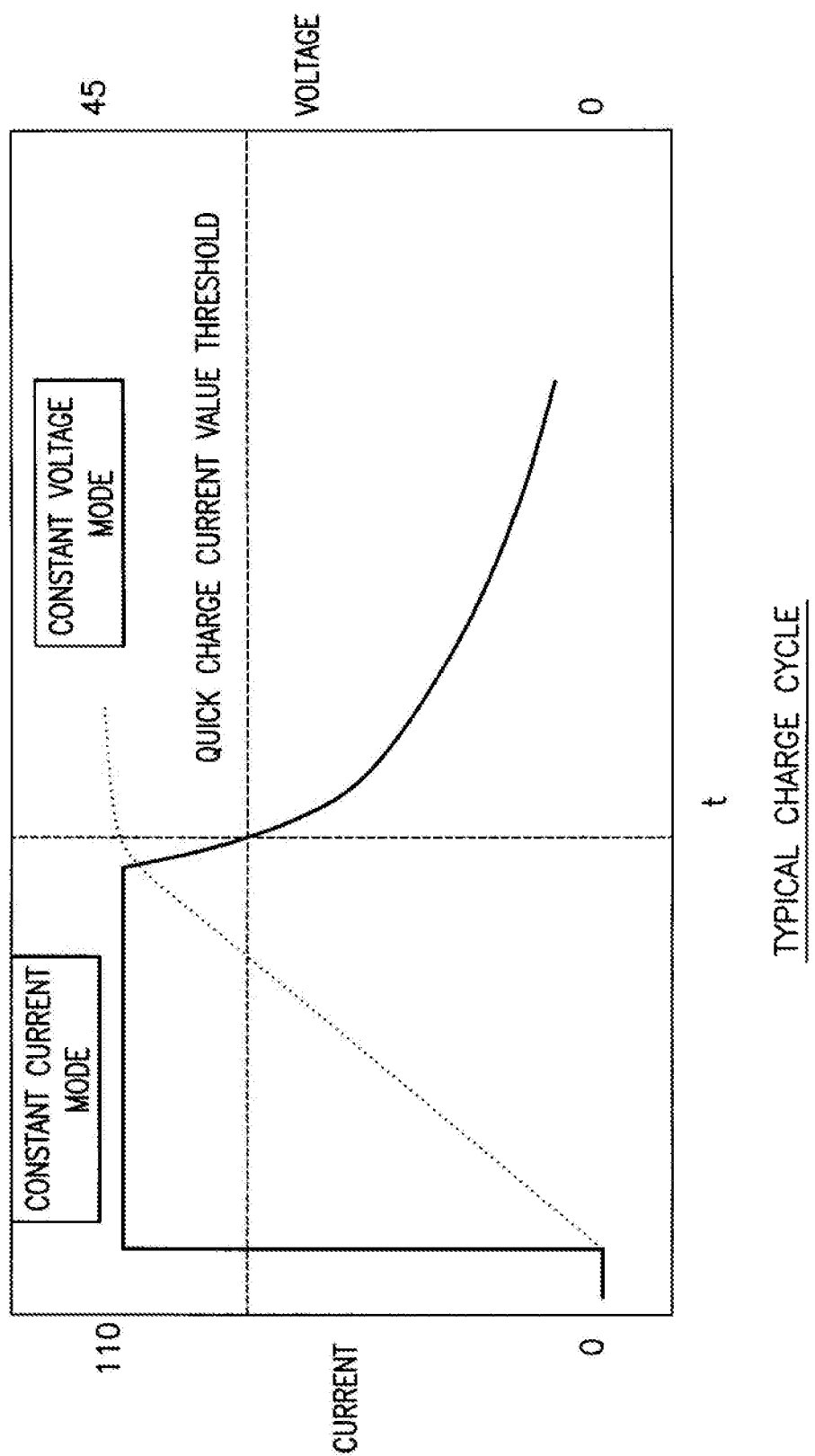
FIG. 4 illustrates an exemplary graph of an autonomous transport vehicle charging cycle in accordance with the embodiments.
Figure 5:
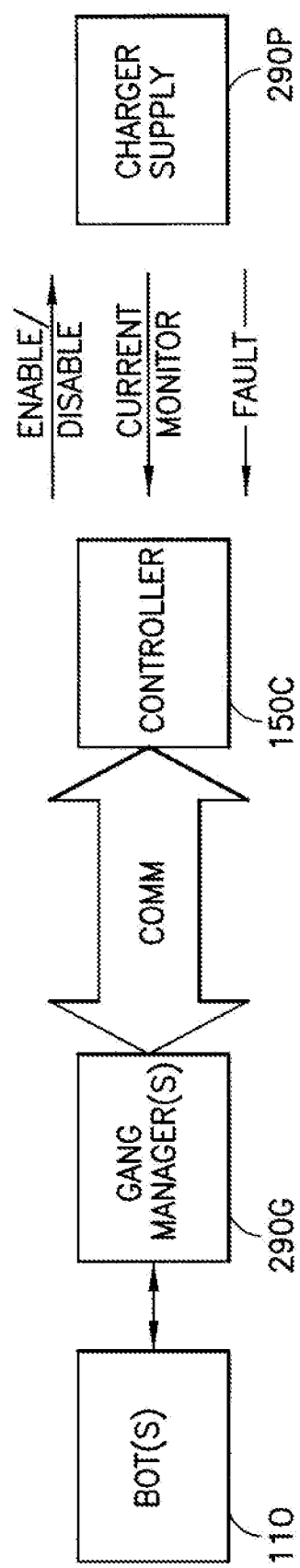
FIG. 5 is a schematic illustration of an exemplary topology for an autonomous transport vehicle charging system in accordance with the embodiments.

Referring to FIGS. 3 and 4, there may be, for example, four charging stations 290A, 290B, 290A2, 290B2 per power supply 290P. The charging stations 290A, 290B, 290A2, 290B2 may be vertically placed within a single multilevel vertical conveyor 150 area and disposed in a rectangular configuration with two charging stations 290A, 290B on one pick floor level and two charging stations 290A2, 290B2 on another different pick floor level, where the pick floor levels may be adjacent to one another. As an example, referring back to FIG. 2A, in this power supply configuration the charging stations of pick floor levels 261, 262 would share a power supply, the charging stations of pick floor levels 263, 264 would share a power supply, etc. It is noted that in the embodiments there may be any suitable number of charging stations on each pick floor level that share a power supply with any suitable number of charging stations from one or more other pick floor levels. Each power supply 290P may be located within a predetermined distance to the charging stations 290 that it serves. For example, power supply 290P may be located less than about 18 feet from the charging stations 290A, 290B, 290A2, 290B2 to, for example, reduce wiring loss and increase charging throughput. It is noted that in the embodiments, the power supplies 290P may be located any suitable distance from their respective charging stations 290.

As described above, each power supply may be controlled by, for example, a controller 150C of a respective multilevel vertical conveyor 150, or any other suitable controller. In the embodiments there can be up to about sixteen power supplies 290 and up to about sixty-four charging stations 290 associated with a single multilevel vertical conveyor 150 where the charging stations are located on different pick floor levels. In the embodiments, the controller 150C may be configured such that when the multilevel vertical conveyor is stopped (e.g. power is shut off to the conveyor) the charging stations 290 will remain operational. Power to the charging stations 290 and the multilevel vertical conveyor may be individually disabled/enabled.

Referring to FIGS. 2B and 3, and with respect to pick floor level 262 for exemplary purposes, the bot charging process may initiated before the bot 110 enters the multilevel vertical conveyor area (e.g. the bot station 140). The bot may initiate communication with the gang manager 290G to request permission to drive on to a particular charging station 290A, 290B. In the embodiments, the decision on which charging station 290A, 290B the bot is to interface with may be dependent on which multilevel vertical conveyor shelf 250 is the intended target and in which location of the shelf 250 the item to be transferred is to be picked from or placed to.

The Bot may remain out of the charging station 290A, 290B area (e.g. the load/unload area of the multilevel vertical conveyor) until it receives permission from, for example, the control server 120 (or other suitable controller such as the vestibule manager of the level manager) that it is safe to enter the charging station 290A, 290B. In one example, the gang manager 290G may have knowledge of any other bots 110 on the pick floor level (which in this example is pick floor 262) that may access the charging station 290A, 290B and may command controller 150C to turn off the power supply 290P for allowing a bot 110 to enter the charging station 290A, 290B. In one example, the gang manager 290G may have the discretion to decide when to turn off the power supply 290P and when to allow the bot 110 on to the charging station 290A, 290B.

Once the Bot has permission to move in to the charging station 290A, 290B (e.g. the multilevel vertical conveyor load/unload area), the bot 110 may maneuver to the intended charging station 290A, 290B and report its position accordingly. Once the bot 110 is located at the intended charging station 290A, 290B, the gang manager 290G may communicate to the controller 150C to re-enable the power supply 290P, at which point the bot 110 will begin charging. This charging of the bot 110 may overlap with charging of other bots 110 that are on the same shared charging system network (e.g. if bot 110 is charging at charging station 290A, other bots 110 may be also be charging at one or more of charging stations 290B, 290A2, 290B2). In the embodiments, the charging process is open ended and may not terminate until commanded to do so by, for example, the gang manager 290G or other suitable controller of the storage and retrieval system 100.

The controller 150C may control the power supply 290P and monitor a status of the power supply 290P. The controller 150 may monitor the status of the power supply 290P and report to, for example, the gang manager 290G when the power supply 290P has reached a constant voltage mode and measures a current output falling below about 75% of its maximum value. It is noted that in the embodiments, the controller 150C may report to, for example, the gang manager 290G at any suitable time such as when the current output is above or below about 75%. At this point, the bot 110 has been "Quick Charged" and can be ready to perform tasks as needed. The gang manager 290G may send a command to terminate the charge cycle if the bot 110 is needed to transport items within the storage and retrieval system 100. If the Bot is not needed, charging may continue and the charger supply may remain on indefinitely. It is noted that in the embodiments the power to the charging station being used may be shut off upon a predetermined condition such as when, for example, the bot reaches a "full charge." A full charge may be accomplished if the Bot remains charging for about five R*C time constants. The time to reach a full charge may be dependent on, for example, such factors including the resistance between the charger station contact 290C and the contacts 110D of the bot 110, the wiring on the bot 110 as well as the resistance inside the capacitor 110C. In one example, a bot 110 may leave the charging station 290A, 290B any time after a quick charge.

In the embodiments there may be N number of gang managers 290G controlling N number of power supplies 290P. For example, the controller 150C of each multilevel vertical conveyor 150 may have addressable ports unique to each power supply 290P. The bot 110 when requesting a charge may communicate, through for example, level manager 297 (FIG. 2B), with a gang manager 290G controlling a power supply 290P for a charging station to which the bot 110 will travel. As described above, the communication between the bots 110 and the level manager 297 as well as the gang manager 290G, controller 150C and power supply 290P (and other suitable components of the storage and retrieval system) may be any suitable communication protocol and methods such as, for example, wired or wireless bidirectional and/or unidirectional communications, Linux based communications, or other suitable communications.

Figure 6:
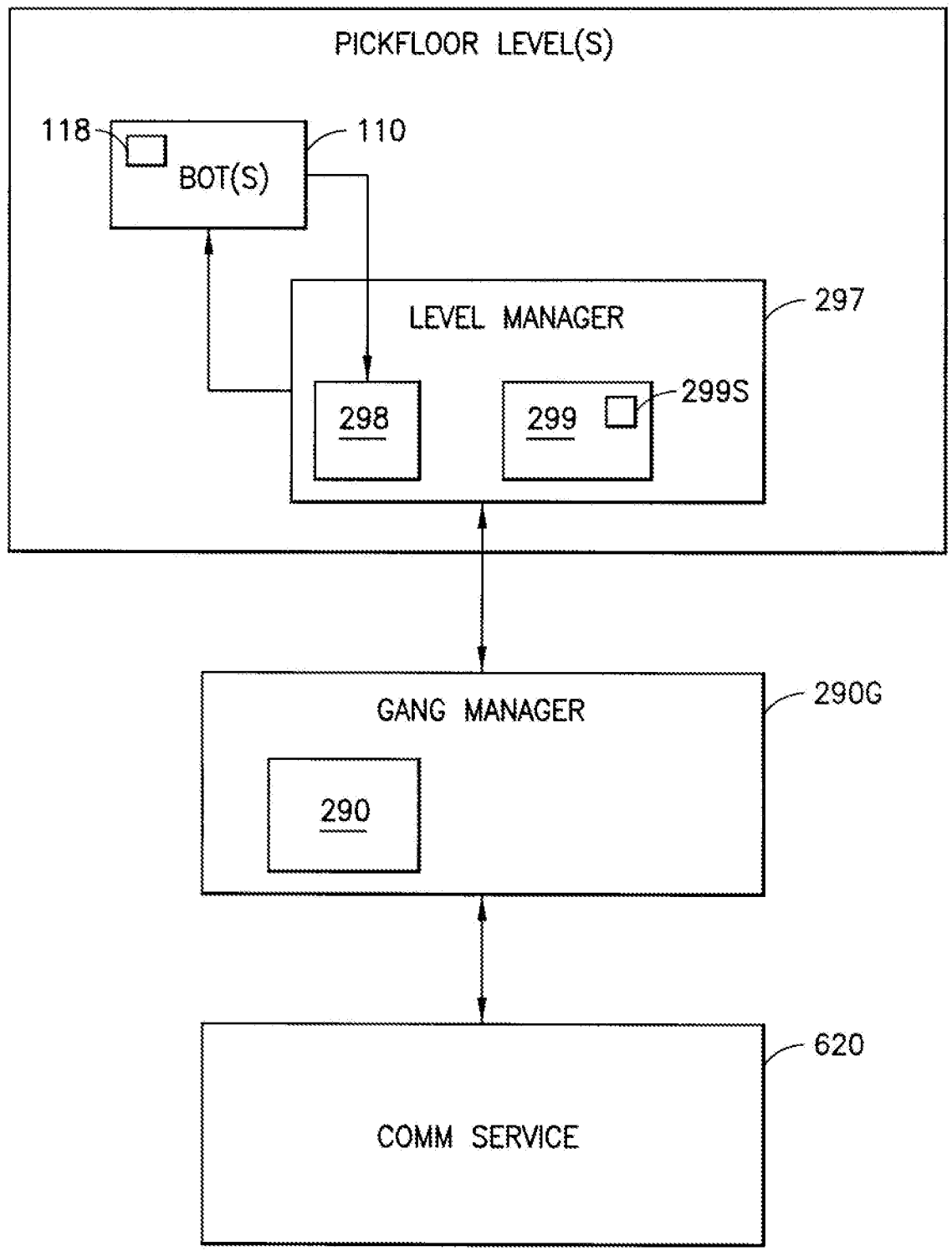
FIG. 6 is a schematic representation of service interactions for an autonomous transport vehicle charging system in accordance with the embodiments.

Referring to FIG. 6, in the embodiments the level manager 297 may manage the bots 110 on a level (or more than one level) to which the level manager 297 is assigned. The level manager 297 may include a bot controller 298 for use by the bots 110, and conversely each bot 110 may include a controller 118 for use by the bot controller 298. There may be, for example, a one to one mapping between the bot controller 298 and each bot 110 (e.g. the level manager 297 includes one bot controller for each bot) or, one bot controller may be mapped to more than one bot. The level manager 297 may also include a charge manager 299 that may act as an intermediary between the bot controller 298 and the gang manager 290G to manage charging.

Each bot controller 298 may communicate with the gang manager 290G via the charge manager 299 to effect charging of the bot 110. In the embodiments there may be, for example, ten multilevel vertical conveyors that intersect the pick floor levels 261-264 (e.g. with twenty charging stations 290 disposed at each pick floor level—e.g. two charging stations per multilevel vertical conveyor intersection). It is noted that in the embodiments there may be any suitable number of multilevel vertical conveyors and charging stations per pick floor level. The charge manager 299 may choose the appropriate charging station 290 to converse with for a given charge cycle. Since bot gangs (e.g. groups of bots charged using the same power supply) span adjacent levels, two level managers 297 may each establish communication connections with the charging stations 290 of their respective levels (which in this example, is twenty charging stations per level).

Conversely, each charge manager 299 may include a charging station status server 299S for each charging station 290, that the gang manager 290G uses to relay power supply status information sent to it by a charging communication service 620. It is noted that the charging communication service 620 may handle status requests from, for example, the controller 150C, on/off requests for, as an example, controller 150C, and requests to enter/leave a charging station 290. Since each gang manager 290G may manage two pick floor levels, it may have connections to, for exemplary purposes only, about four such charging station status server objects, e.g. two for each pick floor level. There may be as many named instances for requests to enter/leave a charging station 290 (e.g. a request instance) as there are charger stations 290. In one example, each group of four request instances maps to a portion of the charging communication service that handles on/off requests, and hosts a portion of the charging communication service that handles charging station status requests.

In an exemplary operation, the bot controller 298 may issue tasks for the bot 110. It is noted that when issuing tasks for the 110, the bot controller 298 may allow for an efficient exchange of items between the bots 110 and the multilevel vertical conveyors. When issuing these tasks the bot controller 298 may do so such that bots 110 are not held up from entering the bot stations 140 (and charging areas 290) for commencing item transfer with the multilevel vertical conveyor 150. Also, when issuing tasks the bot controller may not prevent egress of bots from the charging areas 290 because of bots 110 that have not finished charging or have not received a minimum amount of charge. It is also noted that if a first bot 110 has not completed a case unit 101 transfer with the multilevel vertical conveyor 150 any bots located in charging stations 290 behind the first bot 110 may remain in their charging stations to continue receiving a charge.

Figure 7:
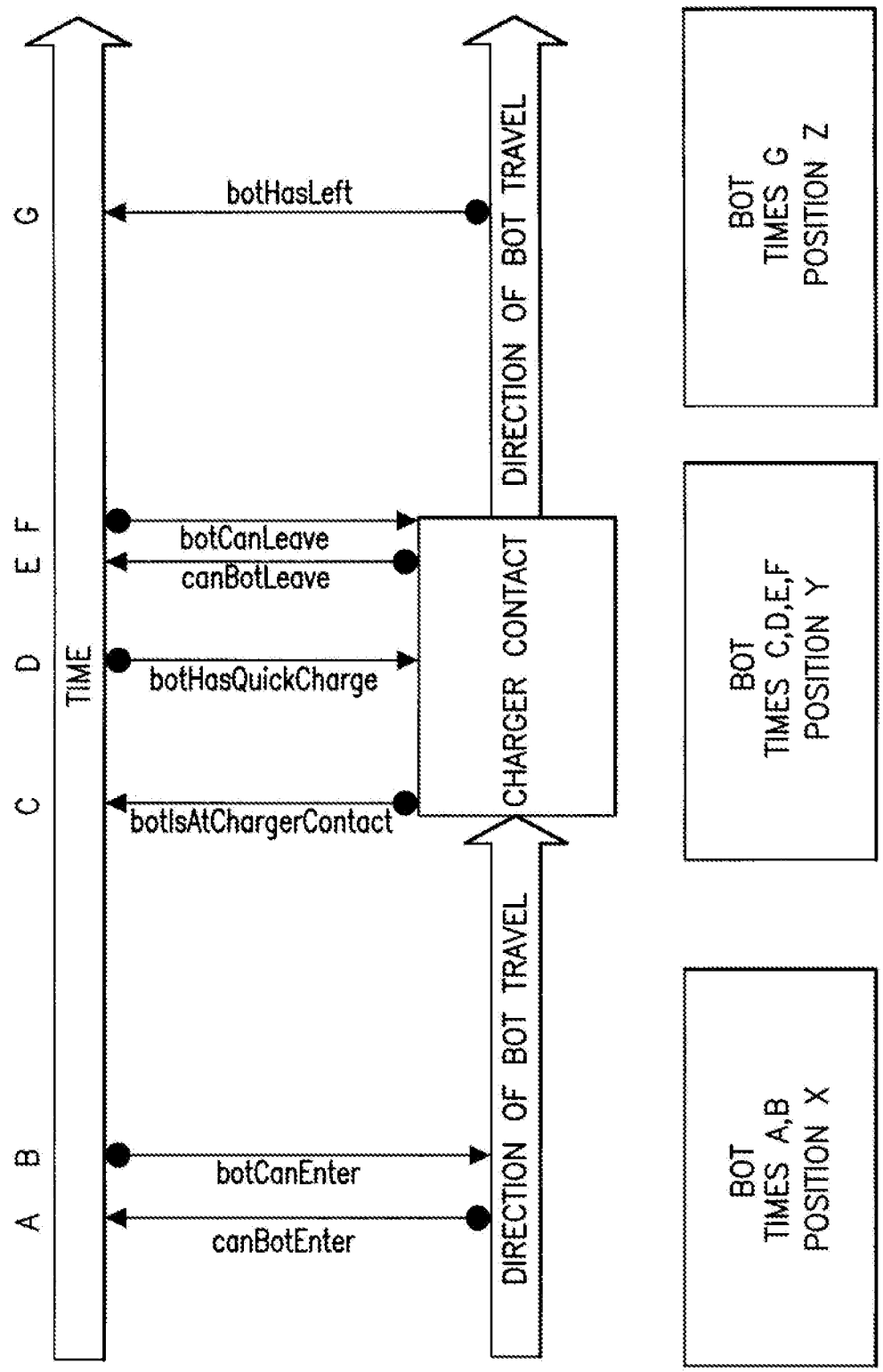
FIG. 7 is a schematic illustration of an autonomous transport vehicle charging sequence in accordance with the embodiments.

Referring to FIG. 7, when issuing tasks the bot controller may be aware of when the bot 110 needs to enter the charging station 290, and when the bot 110 is at the charging station 290. However, the bot controller 298 may not be aware of exactly when in time the bot 110 clears or leaves the charging station 290. The bot controller 298 and the bot 110 may cooperate with each other to create a charging cycle. In an exemplary charging cycle, the bot controller may identify the appropriate charging station 290 to communicate with. The bot controller 298 may request (e.g. a "can bot enter" message) that the charge manager 299 send a "bot can enter" message to the charging station 290. The gang manager 290G may verify that the charging station 290 is turned off and waiting for a charger status to reflect the off status. The gang manager 290G may send a charger status and "bot can enter" message to the charge manager 299, which relays it to the bot controller 298. The bot controller 298 may issue other tasks to the bot 110 via the controller 118. When the bot 110 reaches the charging station 290, the bot controller 298 may wait for a "bot is at charging station" message in order to read a simulated bot voltage and ask the charge manager 299 to send a "bot is at charging station" message to, for example the gang manager 290G. The charge manager may send a "bot has quick charge" message when the bot 110 has received a quick charge. This allows the level manager 297 to mark the bot 110 as available for other tasks, when it finishes any current job, such as the transfer of items between the bot 110 and the multilevel vertical conveyor. When the bot controller 298 deems that the bot 110 should move out of the charging station 290, it asks the charge manager to send a "can bot leave" message, to for example, the gang manager 290G. The gang manager 290G verifies that at least a quick charge has been delivered to the bot 110, turns off the charging station 290 if necessary, and sends a "bot can leave" message, which gets relayed to the bot controller 298 and then to the controller 118. This allows the simulated bot to update its voltage at the end of a charge cycle. It is noted that the simulate bot may exist in the any suitable memory of any suitable controller of the storage and retrieval system such that based on the tasks sent to the bot, the controller can determine how much of a charge remains in the bot. It is noted that in the embodiments, the bots 110 may periodically send a message to the controller indicating a charge status of the bots 110 or that the bots 110 need to be charged. The bot controller 298 may send the next set of tasks to the bot 110. When the bot 110 deems that it is safely out of the charging area, the bot 110 may send a "bot has left" message, which causes the bot controller 298 to send a "bot has left" message via the charge manager 299. The bot 110 need not wait for an acknowledgement or stop its motion to send this message. The power supply 290P gets re-enabled by the gang manager 290G if necessary for other bots remaining at the charger stations 290.

In the embodiments, separately from any ongoing charge cycle interactions, the gang manager 290G may relay power supply status information to, for example, the level manager 297 so that the level manager may route bots 110 away from unavailable chargers. It is noted that the level manager 297 may establish, through for example, the gang manager 290G the operational status of each of the charging stations 290 and whether the charging stations 290 are available.

It is noted that each bot goes through the same charging sequence described above. In the embodiments, the gang manager 290G may be configured to reconcile multiple pending charge requests by turning each of the charging stations on and off, individually or in groups, as needed. The gang manager may also be configured to collectively turn off the charging stations by, for example, turning off the power supply 290P. This is done by keeping track of the number of bots 110 moving to/from the charging stations 290, and the number of bots at the charging stations 290. One non-limiting example, of keeping tracking of bots 110 is as follows:

| Request | Actions |
|---|---|
| Can Bot Enter | If necessary, the charger is turned OFF |
| | When the charger is confirmed to be OFF: |
| | iNumMoving++ |
| | Send botCanEnter |
| Bot Is At Contact | iNumMoving− |
| | iNumAt++ |
| | if(!iNumMoving && iNumAt)turn_charger_on( ) |
| Can Bot Leave | If bot has not received one charge cycle, |
| | defer request until such charge is received |
| | or power supply fails or is disabled. |
| | Charger is turned OFF if necessary |
| | When the charger is confirmed to be OFF: |
| | iNumMoving++ |
| | Send botCanLeave |
| Bot Has Left | iNumMoving− |
| | if(!iNumMoving && iNumAt) turnChargerOn( ) |
| Charger Status | If charger passed the quick charge mark, mark all bots at charger to have received a quick charge so they can leave if desired. Send the botHasQuickCharge( ) message. |
| | If charger turned off as a result of having been turned off, update all bot states as outlined previously so bots can enter or leave the charger contact. |
| | If the charger had an error, send notification on appropriate ChargerContactStatus::isAvailable( ) interfaces. |

The term "Comm Failure" may be used to indicate that the two sides of a communication connection get an "unbind" indication. Conversely, the "bind" indication indicates a (re)connection between the two sides. The following outlines non-limiting exemplary charging specific actions that may be done upon various failures.

| Activity | Value | Rationale |
|---|---|---|
| Comm message transaction time | About 1 second | Expected worst case time for a comm message to reach destination |
| Maximum power supply cutoff voltage | About 46.3 V | Power supply specification |
| Power supply turn off time | About 2 seconds | Hardware behaviour |
| Power supply maximum current | About 110 A | Power supply field configuration |
| Highest bot capacitance | About 181.5 F. | The supercap used on the bots is nominally about 165 F., allow 10% variation |
| Maximum charge time for a bot | About 305 seconds | Largest voltage delta to quick charge = MaxPowerSupplyCutoff - 0 V = about 46.3 V Smallest current while charging = Power supply minimum current/ MaxContactsPerSupply = 111/4 = about 27.25 A Worst case time to charge = max_capacitance * max_delta_V/ min_current = 181.5 * 46.3/27.25 = about 303 seconds Additional about 2 seconds to turn off supply at end. |

-continued

| Activity | Value | Rationale |
|---|---|---|
| Time for bot to move to contact after having received permission to do so | X seconds | Allowance for bot |
| Time for bot to move away from contact after having received permission to do so | Y seconds | Allowance for bot |
| Overall margin | About 10%, minimum, about 1 second | Additional margin for all timeout calculations |

The following are non-limiting exemplary timeout values that may be used to deem a transaction to be a failure.

| Transaction | Time out (sec) | Entity using timeout | Rationale |
|---|---|---|---|
| canBotEnter -> botCanEnter | About 7 | Charge Manager | About 4 comm transactions turn off power supply |
| botCanEnter -> botIsAtContact | About 8 | Gang Manager | About 2 comm transactions move bot |
| botIsAtContact -> botHasQuickCharge | About 338 | Charge Manager | About 2 comm transactions to gang manager Max charge time = N seconds |
| canBotLeave -> botCanLeave | About 7 | Charge Manager | About 4 comm transactions turn charger off |
| botCanLeave -> botHasLeft | About 6 | Gang Manager | Move bot |
| Time to turn off a bot | About 5 | Gang Manager | off cycle About 1 each for comm |
| Time to charge a bot | About 338 | Gang Manager | About 2 comm transactions max charge time = N seconds |

When there is a power supply failure a message may be relayed from the gang manager 290G. During a power supply failure the bots 110 may be allowed to leave the charging stations 290 even if the bots have not received a minimum amount of charge. The charge manager 299 may use the information from the gang manager 290G in conjunction with, for example, the state of the bot 110 or bot controller's 298 conversation with the gang manager 290G to complete any pending charging cycles, and mark the charging station(s) 290 connected to the failed power supply as inoperable. In this case the gang manager 290G and or charger manager 299 may find other available charging stations 290 and communicate with the level manager 297 for routing the bots 110 that did not receive the minimum amount of charge to these available charging stations 290 (e.g. without impeding ingress/egress to the respective multilevel vertical conveyors 150 at the locations of the available charging stations 290.

With respect to other exemplary communications within the bot charging system, the bots 110 may communicate with a respective bot controller 298 to indicate a simulated bot's voltage and that the bot has left (or arrived at) a charging station 290. The bot controller 298 may communicate with a respective bot 110 a post-charge voltage that may be valid only during a simulation. The charge manager 299 may communicate with the charging stations 290 to ensure the charging station is off so a bot 110 can enter or leave the charging station 290. The charge manager 299 may also indicate when gang charging can start or resume, indicate that a bot has left a charging station and to resume charging and to enable/disable one or more charging stations. The gang manager 290G may indicate the charging station is off so that the bot can move on to or off the charging station, that the bot has received a quick charge, and a state of the charging station 290 (e.g. whether the charging station is inoperable, off, in constant current mode, in constant voltage mode, etc.).

Figure 8:
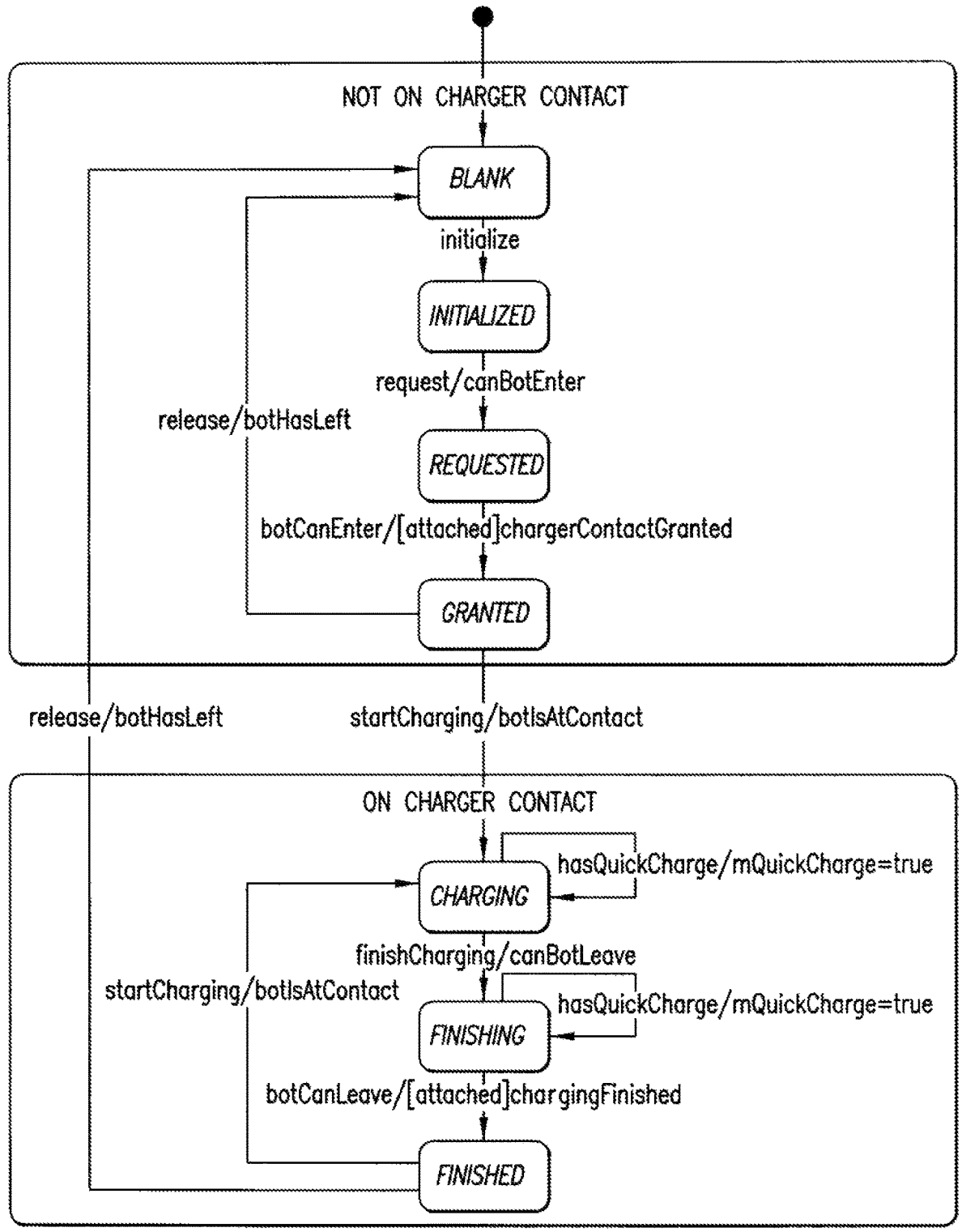
FIG. 8 is an illustration of an exemplary charger state diagram in accordance with the embodiments.

In the embodiments, the bot controller 298 may be configured to allocate the charging stations 290 using reservations (e.g. each bot that is to access a particular charging station "reserves" or allocates that charging station so no other bots are able to access it during the reservation period). When a bot 110 with a reservation accesses a charging station 290 it receives a charge and when complete the bot 110 requests to release (e.g. un-reserve) the charging station 290 so that the charging station 290 can be reserved for other bots 110. FIG. 8 illustrates a transaction state diagram for a charging sequence in which a reservation is held. For example, before the bot enters the charging station 290 a request is made for the bot to enter the charging station. If there is no bot present at the charging station 290 the request may be granted and the bot enters the charging station 290. If only a transfer of items to/from a multilevel vertical conveyor 150 is being made, the transfer may take place and a request for release of the charging station 290 may be sent by the bot 110 and after the release a notification that the bot 110 has left may be made. Where charging is to occur (in addition to or in lieu of a transfer of items to/from the multilevel vertical conveyor 150) charging may occur when the bot 110 is in the charging station 290. A check may be made as to whether the bot 110 has received a quick charge. If the bot 110 has received a quick charge the bot 110 is able to leave the charging station 290 and makes a request to release the charging station 290. Once the charging station 290 is released the bot 110 exits the charging station 290 and an indication that the bot 110 has left is made.

Figure 9:
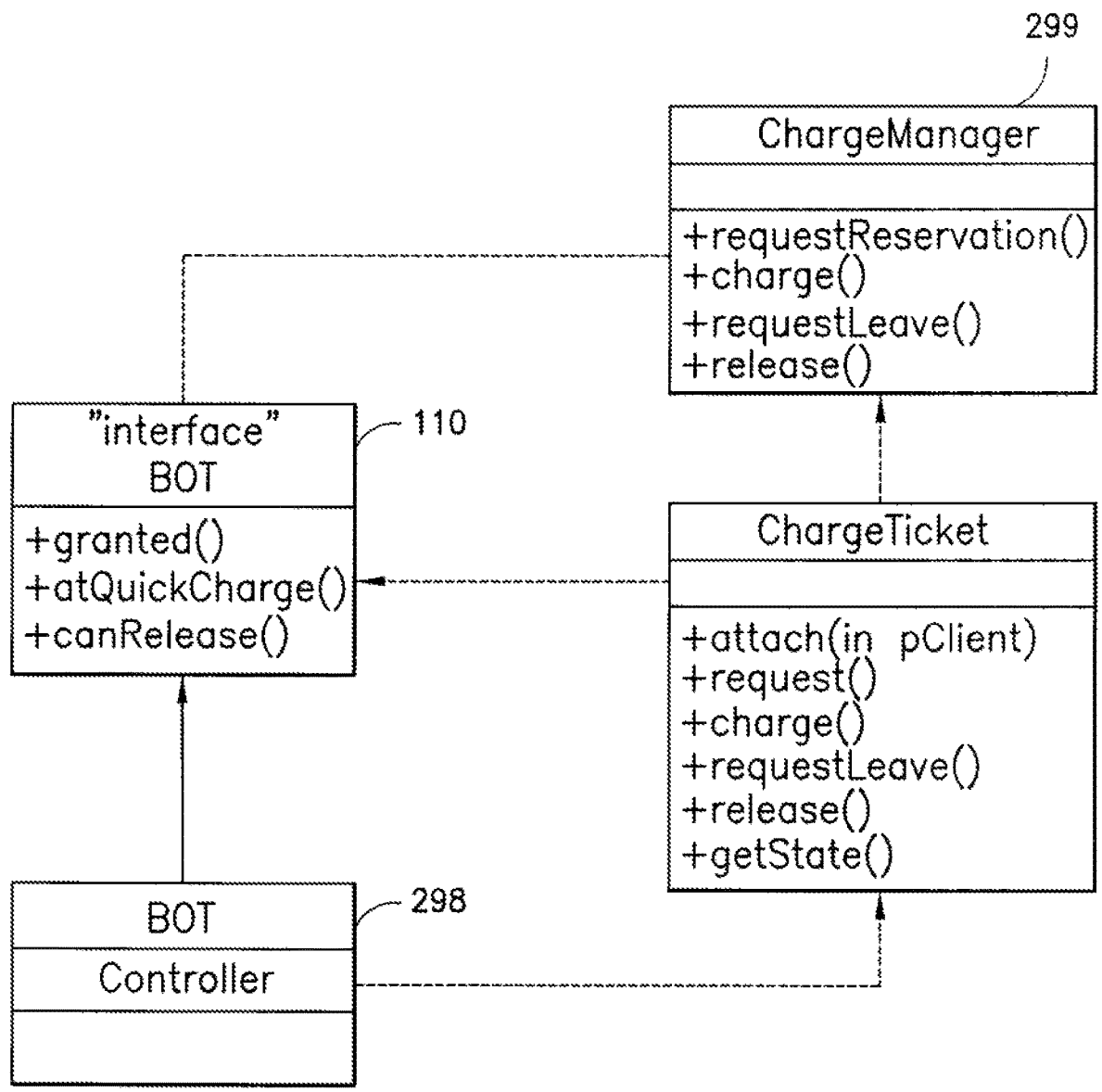
FIG. 9 is a schematic illustration of a portion of a communication hierarchy for an autonomous transport vehicle charging system in accordance with the embodiments.

FIG. 9 illustrates exemplary class hierarchies and dependencies with respect to communication between the charge manager 299 and the bots 110.

In the embodiments the operational state of the charging station within a vestibule 130V may be linked in any suitable manner to an operational state of a corresponding multilevel vertical conveyor 150. Referring to FIG. 10, for exemplary purposes only four vestibules 130V1-130V4 of a single pick floor level are shown where each vestibule 130V1-130V4 has two charging stations 290. It is noted that in the embodiments the storage and retrieval system may have any suitable number of vestibules each having any suitable number of charging stations. Each vestibule is served by a respective multilevel vertical conveyor 150-1, 150-2, 150-3, 150-4. Each of these multilevel vertical conveyors also serves other vestibules vertically stacked above and/or below a respective one of the vestibules 130V1-130V4.

Upon startup of the level manager 297, with respect to charging operations of the bots 110, the charge manager 299 knows the structural information about each charging station 290 (e.g. where they are located and which multilevel vertical conveyor is associated with the respective charging stations). The charge manager 299 may communicate with each charging station 290 to obtain, for example, an operational status of the charging stations 290. The bot controller 298 of the level manager 297 may communicate with the bots 110 for issuing commands or jobs (e.g. to transfer case units 101) to the bots 110.

When a bot, such as bot 110X, needs to be charged, whether in conjunction with the transfer of a case unit 101 to/from a multilevel vertical conveyor 150-1, 150-2, 150-3, 150-4 or not, the bot may send a message to a vestibule manager 296 for determining which vestibule 130V1-130V4 the bot is to be directed to. In the embodiments the vestibule manager 296 may be part of the level manager 297 or, the vestibule manager 296 may be included in any suitable controller of the storage and retrieval system. If the charging of bot 110X is not in connection with a case unit 101 transfer, the vestibule manager 296 may direct the bot 110X to a vacant or unallocated operational charging station 290 in a nearest "online" or operational vestibule 130V1-130V4. If the charge of the bot 110X is in conjunction with a transfer of case units 101 to/from a multilevel vertical conveyor 150-1, 150-2, 150-3, 150-4, the vestibule manager 296 may communicate with the vestibule (which for exemplary purposes may be vestibule 150-3) at which the bot 110X is to transfer the case units 101 to verify that the charging stations 290 of that vestibule are operational. At least one of the charging stations at, for example, vestibule 150-3 may be reserved for the bot 110X as described above. If however, one or more of the charging stations for the vestibule 150-3 is determined as being inoperable a suitable controller of the storage and retrieval system such as control server 120 may inform the level manager 297 and/or the vestibule manager 296 that the vestibule 150-3 is "offline" or inoperable such that no case units 101 can be transferred to the multilevel vertical conveyor 150-3 nor can bots 110 be charged at other operational charging stations 290 of offline vestibule 130V3. The level manager 297, with information provided by the vestibule manager 296, may communicate with bot 110X and direct the bot 110X to an available charging station 290 of the next available vestibule 130V1-130V4 for transferring the item 101 while simultaneously charging the bot 110X.

In the embodiments, vestibules vertically stacked above and/or below vestibule 130V3 may still be able to charge bots 110 and transfer case units 101 to the multilevel vertical conveyor 150-3. In the embodiments, because the charging stations 290 of vestibule 130V3 may be powered by the same power supply 290P (FIG. 3) as charging stations of vestibules stacked above and/or below vestibule 130V3, all of the vestibules associated with the power supply of vestibule 130V3 may be designated as offline for charging and item 101 transfers. Still, the vestibule 130V3 may remain "online" so that bots can charge and transfer case units 101 at the remaining operational charging station(s) 290 of the vestibule 130V3. The vestibule 130V3 may also remain online with respect to item transfers such that, if bot 110X has a sufficient charge, the bot 110X can transfer items at a location of the inoperable charging station 290 and then move on to be charged at a next available charging station 290 at the same vestibule 130V3 or different vestibule 130V1, 130V2, 130 V4.

Figure 11:
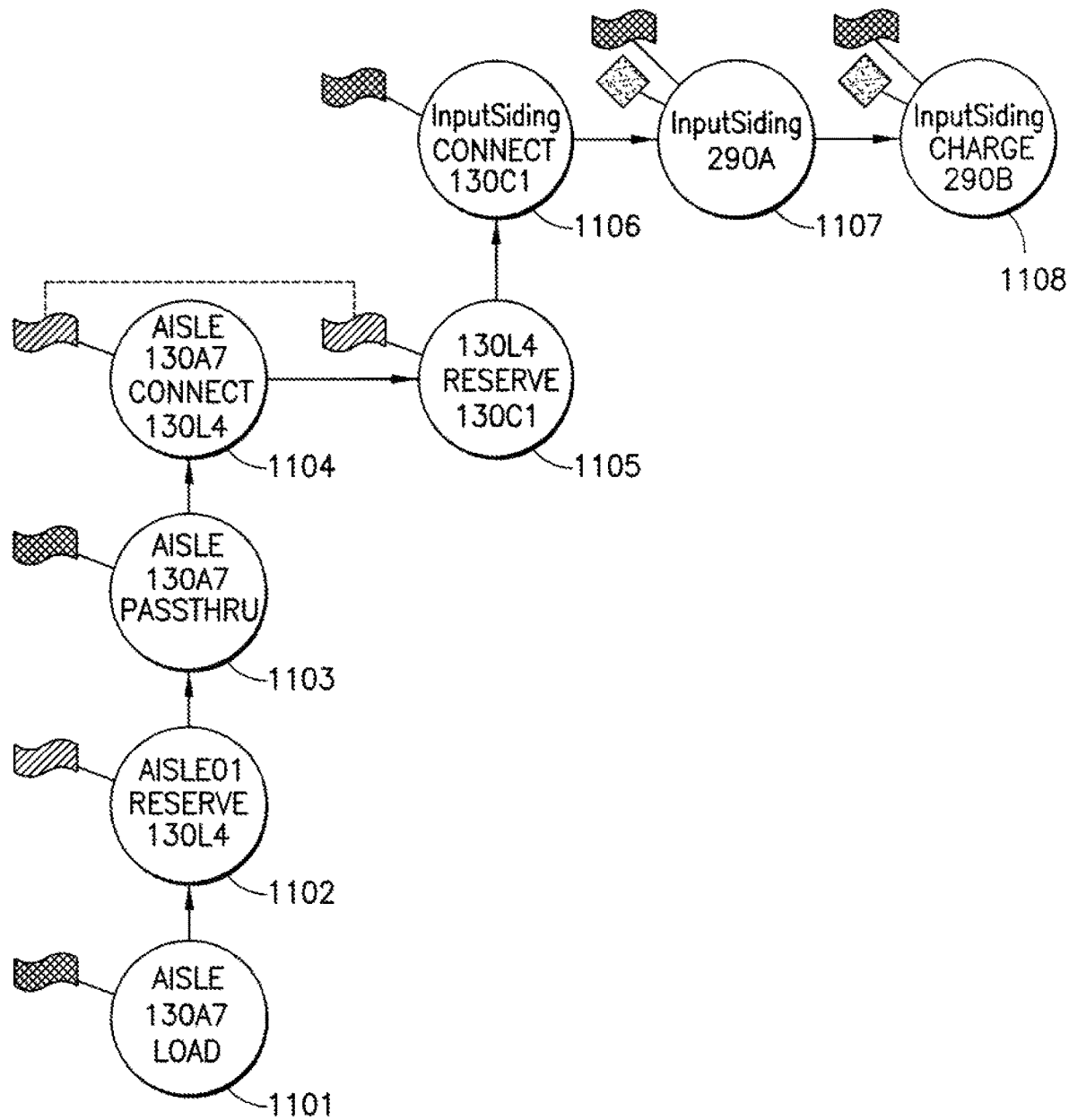
FIG. 11 illustrates a schematic waypoint list for an autonomous transport vehicle in accordance with the embodiments.
Figure 12:
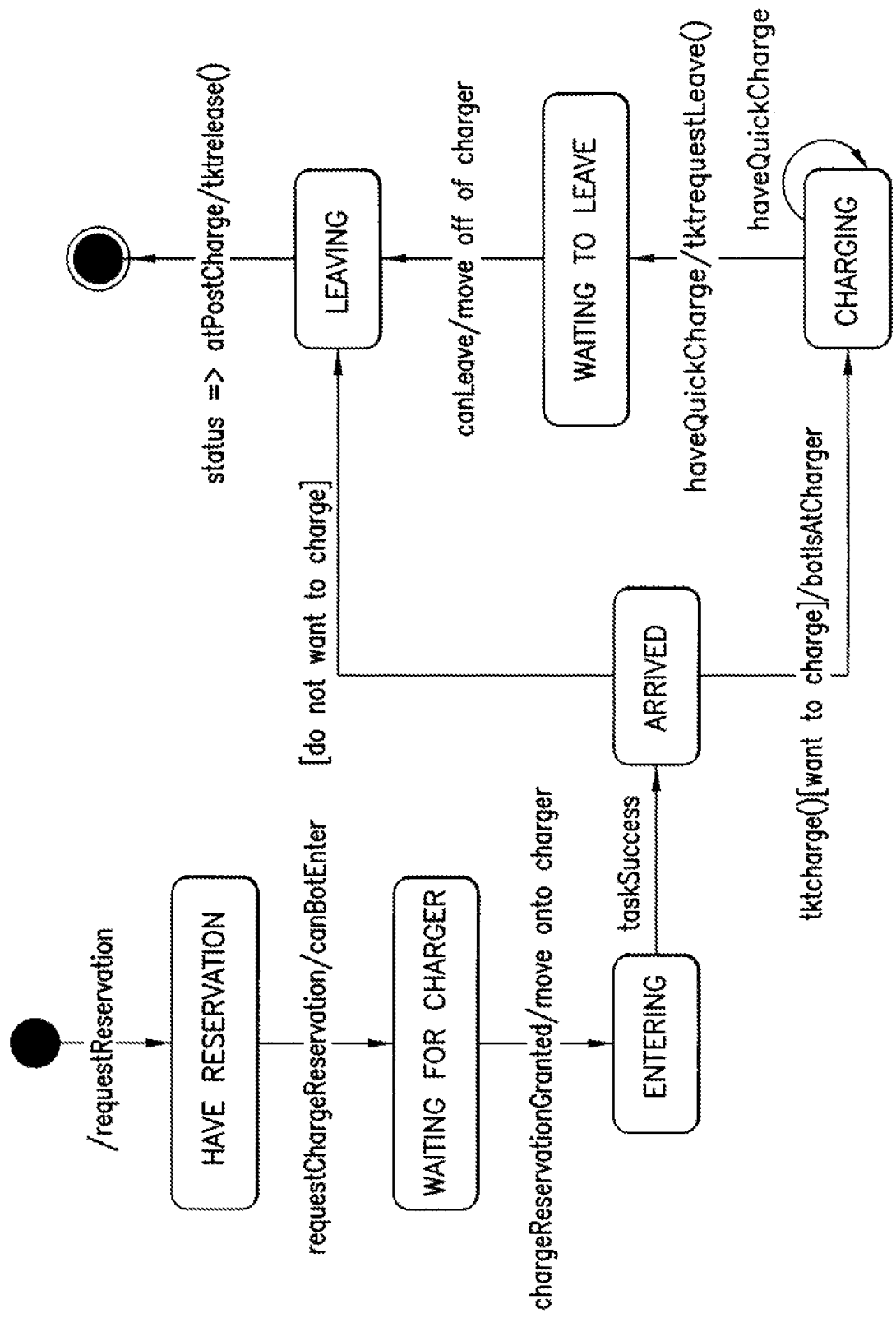
FIG. 12 illustrates an exemplary schematic state chart diagram for a portion of an autonomous transport vehicle charging system in accordance with the embodiments.
Figure 13:
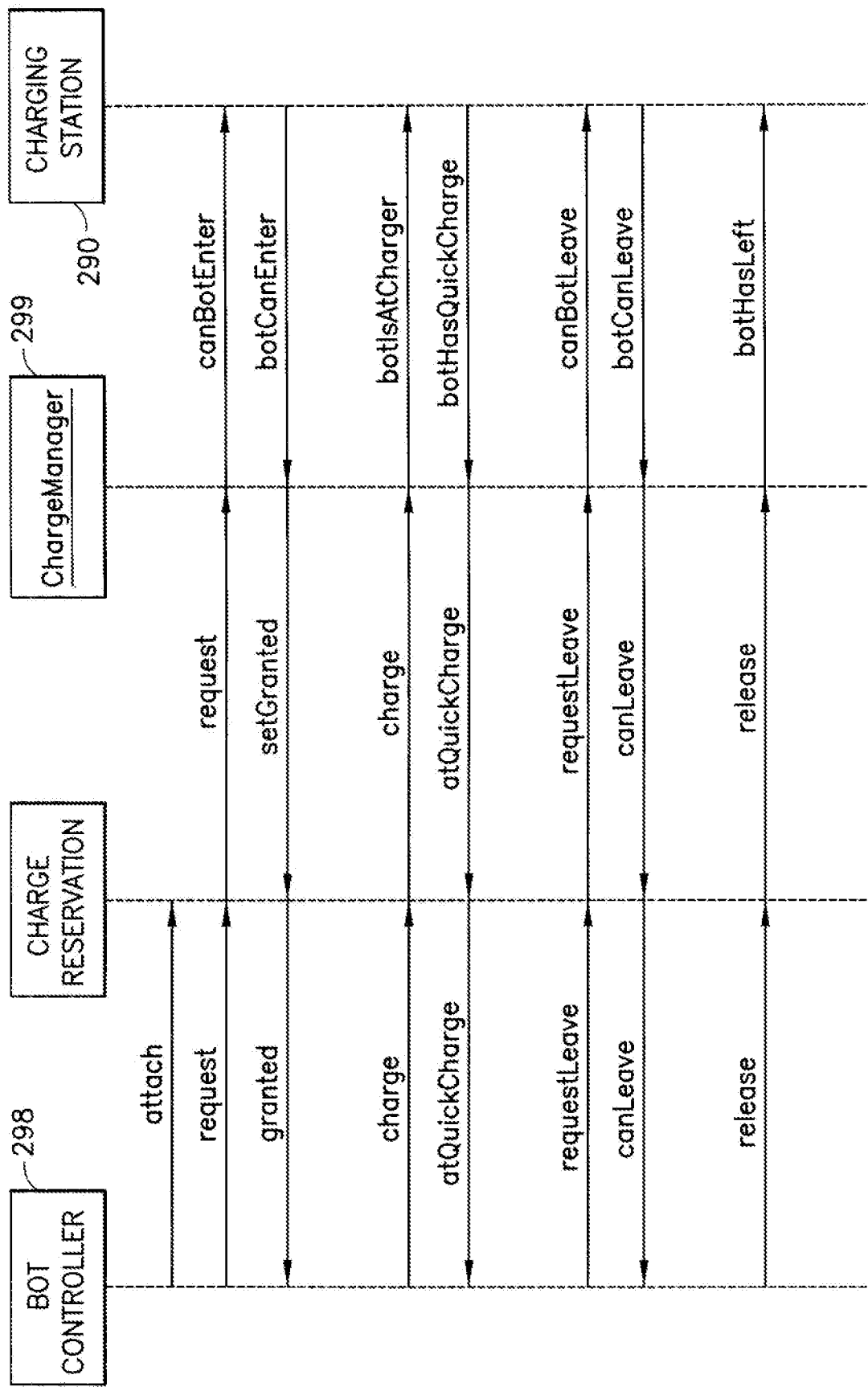
FIG. 13 is a schematic illustration of an exemplary sequence diagram for charging transactions of an autonomous transport vehicle charging system in accordance with the embodiments.

Referring to FIGS. 11-13 and also to FIGS. 2B and 6 the bot controller 298 and charge manager 299 may interact with each other for reserving resources within the storage and retrieval system 100. It is noted that FIG. 12 illustrates a state chart diagram for bot controller 298 interaction for reserving resources of the storage and retrieval system and FIG. 13 illustrates a sequence diagram of how each reservation request for a charging station translates into a reservation of the charging station. As an example, bot 110X may be designated by bot controller 298 for charging at charging station 290B of vestibule 130V. Travel of the bot 110X may be defined by waypoints 1101-1108 within the storage and retrieval system 100. As the bot travels the bot controller 298 of level manager 297 may look to each waypoint for reserving a resource of the storage and retrieval system to allow the bot 110X to travel along a predetermined course. Prior to or during reservation of the resources by the bot controller 298 the charge manager may confirm that a desired charging resource and any intervening charging resources are available or will be available at the time they are needed by the bot 110X. If the charging resources are available the bot controller 298 continues with planning the predetermined route, which in this example, is charging station 290B. If one or more of the charging resources and intervening charging resources are not or will not be available the route of the bot 110X may be re-routed to an available charging resource (and corresponding multilevel vertical conveyor). In this example, the bot 110X may start in picking aisle 130A7 for picking a case unit 101. Picking aisle 103A7 may be reserved by the bot 110X while the bot 110 is located within the aisle 130A7. As the bot is travelling out of the picking aisle 130A7 a request to reserve an entrance onto guide line or travel path 130L4 is made and granted. Once on the guide line 130L4 a reservation is requested for travelling along vestibule 130V/multilevel vertical conveyor 150 entrance guide line or path 130C1 and is granted. The bot controller looks to the next waypoint 1107 and requests a reservation for the multilevel vertical conveyor transfer location 290T1 and if the availability of the transfer location 290T1 is verified the request is granted. The bot controller may check to see of the transfer location 290T1 is also a charging resource, which it is, and requests a reservation for charging station 290A and if the charging station is available the request is granted. Even though the bot 110X will not transfer case units 101 or charge at transfer location 290T1/charging station 290A, the bot 110X passes through these areas on its way to charging station 290B and reserves transfer location 290T1/charging station 290A to ensure passage to charging station 290B. The bot controller also looks to waypoint 1108 to reserve multilevel vertical conveyor transfer location 290T2 and if the availability of the transfer location 290T2 is verified the request is granted. The bot controller 298 may check to see of the transfer location 290T2 is also a charging resource, which it is, and requests a reservation for charging station 290B and if the charging station is available the request is granted. After the bot passes through transfer location 290T1 and charging station 290A the bot controller releases transfer location 290T1 and charging station 290A so these resources are available to other bots 110. While the bot 110X is at the transfer location 290T2, the bot 110X may transfer case units 101 between the bot 110X and the conveyor shelf 250 while simultaneously receiving a charge from charging station 290B. Upon reaching a quick charge level the bot 110X the bot controller 298 is notified of the quick charge being substantially complete and requests that the bot 110X leave the transfer location 290T2 and charging station 290B. The bot 110X verifies that it has left the transfer location 290T2 and charging station 290B and the bot controller releases the transfer location 290T2 and charging station 290B so they become available resources for other bots 110.

Referring again to FIGS. 6 and 10, as described above, when a charging station 290 becomes inoperable the storage and retrieval system is configured to re-route a bot 110 to another operable charging station 290. In one exemplary embodiment when a charging station 290 becomes inoperable all affected bot controllers 298 are notified for taking appropriate action such as, for example, canceling jobs directed to the inoperable charging station. It is noted that in one exemplary embodiment the affected bot controller 298 may be bot controller for pick floor levels having charging stations powered by the same power supply as the inoperable charging station. Any bot jobs not yet scheduled (e.g. that have already been re-routed) may not be allocated to the inoperable charging stations 290 or their corresponding multilevel vertical conveyors 150 for at least the pick floor level on which the inoperable charging station 290 is located.

Referring again to FIG. 2B in the embodiments the controller 150C may be used to initiate and monitor charging of the bots 110. In one example the gang manager 290G may start the power supply 290P and the controller 150C may enable the power supply output. The controller 150C may monitor an operational status of the power supply and alert the gang manager 290G if there is any inoperability of the power supply 290P. The controller 150C may wait a predetermined amount of time before monitoring the power supply 290P (e.g. to avoid any inrush power spikes) and maintain a record of the current of the power supply and monitors the current for a condition where the current drops below a predetermined level. The gang manager 290G may turn off the power supply for any suitable reason (such as e.g. when a bot wants to enter or leave a charging station) and the controller 150C may turn off the power to the chargers and direct the bots 110 accordingly.

In a first aspect of the embodiments, a charging system for autonomous transport vehicles in a warehouse storage and retrieval system is provided. The charging system includes at least one charging contact disposed on each pick floor level of the storage and retrieval system, each of the at least one charging contact being located at a transfer station, at least one power supply configured to supply power to the at least one charging contact and a first controller in communication with the transfer station and being configured to communicate information relating to a transfer of items between the transfer station and a predetermined one of the autonomous transport vehicles and to apply power from the power supply to the at least one charging contact for charging the predetermined autonomous transport vehicle corresponding to the transfer and located at the multilevel vertical conveyor transfer station, wherein the first controller is configured to supply power to the charging contacts for charging the predetermined autonomous transport vehicle simultaneously with the predetermined autonomous transport vehicle exchanging items at the transfer station.

In accordance with a first sub-aspect of the first aspect of the embodiments, the charging system further comprising a capacitor disposed on the autonomous transport vehicle and a receptacle configured to interface with the at least one charging contact where the engagement is configured to transfer power to the capacitor.

In accordance with the first sub-aspect of the first aspect of the embodiments, the receptacle includes a contact pad and the at least one charging contact includes actuable members configured to engage the contact pad.

In accordance with the first aspect of the embodiments, each pick floor of the storage and retrieval system includes at least one vestibule extending from a transfer deck and located adjacent a respective multilevel vertical conveyor, wherein at least one charging contact is located in each of the at least one vestibule.

In accordance with the first aspect of the embodiments, the transfer station includes a multilevel vertical conveyors and the operation of the at least one charging contact and an associated multilevel vertical conveyor are linked such that when the at least one charging contact is inoperable the controller deems the multilevel vertical conveyor inoperable at least for the pick floor level on which the at least one charging contact is located.

In accordance with the first aspect of the embodiments, the first controller is configured to control operations of the power supply and the multilevel vertical conveyor.

In accordance with a second sub-aspect of the first aspect of the embodiments, the charging system further comprises a second controller configured to effect a charge cycle of each autonomous transport vehicle located on at least one pick floor level simultaneously with the exchange of items with the multilevel vertical conveyor.

In accordance with a second aspect of the embodiments, a storage and retrieval system is provided. The storage and retrieval system includes, at least one autonomous transport vehicle, at least one transfer station having an operable and inoperable state where in the operable state the at least one transfer station is configured to allow transfer of items from and to the at least one autonomous transport vehicle, at least one charging station disposed on each pick floor level of the storage and retrieval system, each of the at least one charging contact being located at a respective one of the at least one transfer station, at least one power supply configured to supply power to the at least one charging contact, and a controller in communication with the transfer station and being configured to communicate information relating to a transfer of items between the transfer station and a predetermined one of the autonomous transport vehicles and to apply power from the power supply to the at least one charging station for charging the at least one autonomous transport vehicle located at the transfer station, wherein the controller is configured to supply power to the charging station for charging a predetermined autonomous transport vehicle corresponding to the transfer of items simultaneously with the predetermined autonomous transport vehicle exchanging items related to the transfer at a predetermined transfer station when the predetermined transfer station is in the operative state and to supply power to the charging station for charging another of the at least one autonomous vehicles located at the predetermined transfer station when the predetermined transfer station is in the inoperative state.

In accordance with the second aspect of the embodiments, the storage and retrieval system further includes at least one multilevel conveyor and at least one pickfloor level having storage locations, at least one vestibule and a transfer deck connecting the storage locations with the at least one vestibule, each of the at least one vestibules having at least one of the at least one transfer station configured to provide access to a respective one of the at least one multilevel vertical conveyor, wherein the controller is configured to control operations of at least one of the at least one multilevel vertical conveyors and operations of at least one charging station located in vestibules associated with the respective multilevel vertical conveyor.

In accordance with the second aspect of the embodiments, a level controller is connected to each pick floor level and configured to control storage and retrieval operations of the respective level, the level controller being further configured to link operations of the at least one multilevel vertical conveyors with associated charging stations such that access to the at least one multilevel vertical conveyor is prevented when one or more of the associated charging stations is inoperable.

In accordance with a first sub-aspect of the second aspect of the embodiments, the storage and retrieval system includes at least one power supply, the at least one power supply being commonly connected to charging stations of vertically adjacent ones of the at least one pick floor level.

In accordance with the first sub-aspect of the second aspect of the embodiments, the charging stations commonly connected to the at least one power supply comprising a two by two array of charging stations where a first two of the charging stations in the array are located on a first pick floor level and a second two of the charging stations in the array are located on a second pick floor level, the first two of the charging stations and the second two of the charging stations being vertically stacked one above the other.

In accordance with the first sub-aspect of the second aspect of the embodiments, each vestibule includes at least two charging stations arranged on a common linear path.

In accordance with the first sub-aspect of the second aspect of the embodiments, the transfer deck includes an array of autonomous transport vehicle travel paths, the array including longitudinal travel paths providing access to the storage locations and the at least one vestibule and transverse travel paths providing shunts between the longitudinal travel paths.

In accordance with the second sub-aspect of the second aspect of the embodiments, the controller is configured to reserve one or more of the charging stations for allowing an autonomous transport vehicle access to the one or more of the at least two charging stations.

In accordance with the second aspect of the embodiments, the controller is configured to re-route an autonomous transport vehicle destined for a charging station at a first vestibule to a charging station at another vestibule when the charging station at the first vestibule is inoperable.

In accordance with the second aspect of the embodiments, when in the unallocated state the transfer station is not configured to allow transfer of items from and to the at least one autonomous transport vehicle.

It should be understood that the embodiments disclosed herein can be used individually or in any suitable combination thereof. It should also be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

What is claimed is:

1. A method comprising:
providing at least one autonomous transport vehicle;
providing at least one transfer station having an allocated and unallocated state where in the allocated state the at least one transfer station allows transfer of items from and to the at least one autonomous transport vehicle;
providing at least one charging station on a pick floor level of a storage and retrieval system, the at least one charging station being located in communication with a respective one of the at least one transfer station;
providing at least one power supply configured to supply power to the at least one charging station;
communicating, with a controller in communication with at least one of the at least one charging station or the at least one autonomous transport vehicle, information related to interface between a predetermined at least one transfer station and a predetermined one of the at least one autonomous transport vehicle; and
with the controller, applying power from the at least one power supply to the at least one charging station for charging the at least one autonomous transport vehicle, wherein the controller supplies power to the at least one charging station for charging the predetermined one of the at least one autonomous transport vehicle corresponding to the interface with the predetermined one of the at least one autonomous transport vehicle interfacing at the predetermined at least one transfer station with the predetermined at least one transfer station in the allocated state and identifying an unallocated time period with the predetermined at least one transfer station in the unallocated state and continuous charging of the at least one autonomous transport vehicle or initiating charging of a different another one of the at least one autonomous transport vehicle in the unallocated state.

2. The method of claim 1, further comprising identifying, with the controller, a next allocated time period for the different another one of the at least one autonomous transport vehicle at the at least one charging station of the predetermined at least one transfer station.

3. The method of claim 1, further comprising effecting, with the controller, at least one of a quick charge and a full charge to both
the predetermined one of the at least one autonomous transport vehicle corresponding to the transfer of items with the predetermined one of the at least one autonomous transport vehicle transferring the items at the predetermined at least one transfer station when the predetermined transfer station is in the allocated state, and
an idle autonomous transport vehicle at the at least one charging station when the predetermined at least one transfer station is in the unallocated state
wherein the full charge is effected with the at least one autonomous transport vehicle at the at least one charging station during the allocated state and remaining at least part of the unallocated state and the quick charge is effected on determination by the controller that a time period of the allocated state and unallocated state of the predetermined at least one transfer station is less than a charge period for full charge.

4. The method of claim 1, wherein the at least one power supply is commonly connected to the at least one charging station of vertically adjacent ones of the at least one pick floor level.

5. The method of claim 4, wherein the at least one charging station is commonly connected to the at least one power supply comprising a two by two array of charging stations where a first two of the charging stations in the array are located on a first pick floor level of the at least one pick floor level and a second two of the charging stations in the array are located on a second pick floor level of the at least one pick floor level, the first two of the charging stations and the second two of the charging stations being vertically stacked one above the other.

6. The method of claim 1, further comprising reserving, with the controller, access to one or more of the at least one charging station by one of the at least one autonomous transport vehicles.

7. The method of claim 1, further comprising re-routing, with the controller, one of the at least one autonomous transport vehicles destined for a first charging station, of the at least one charging station, to a second charging station, of the at least one charging station, when the first charging station is inoperable.

8. The method of claim 1, wherein the at least one transfer station includes a lift and operation of the at least one charging station and an associated lift are linked such that when the at least one charging station is inoperable the controller deems the associated lift inoperable at least for the pick floor level on which the at least one charging station is located.

9. A method comprising:
  providing at least one autonomous transport vehicle;
  providing at least one transfer station having an allocated and unallocated state where in the allocated state the at least one transfer station allows transfer of items from and to the at least one autonomous transport vehicle;
  providing at least one charging station on each of at least one pick floor level of a storage and retrieval system, each of the at least one charging station being linked to a respective one of the at least one transfer station;
  providing at least one power supply configured to supply power to the at least one charging station;
  communicating, with a controller in communication with at least one of the at least one charging station and the at least one autonomous transport vehicle, information related to a transfer of items between the at least one transfer station and a predetermined one of the at least one autonomous transport vehicle; and
  applying power, with the controller, from the power supply to the at least one charging station for charging the at least one autonomous transport vehicle arriving and departing the at least one transfer station, wherein the controller is configured to supply power to the at least one charging station to effect at least one of a quick charge and a full charge depending on identification of an unallocated time period of the at least one transfer station in the unallocated state.

10. The method of claim 9, wherein each of the at least one pick floor level includes a transfer deck and a picking aisle in communication with the at least one charging station.

11. The method of claim 10, further comprising communicating with an idle autonomous transport vehicle on one of the transfer deck and the picking aisle, with the controller, and identifying a nearest available transfer station, of the at least one transfer station, in the unallocated state for charging the idle autonomous transport vehicle at the at least one charging station of the nearest available transfer station, of the predetermined at least one charging station, in the unallocated state.

12. The method of claim 9, wherein the at least one power supply is commonly connected to the at least one charging station of vertically adjacent ones of the at least one pick floor level.

13. The method of claim 12, wherein the at least one charging station is commonly connected to the at least one power supply comprising a two by two array of charging stations where a first two of the charging stations in the array are located on a first pick floor level of the at least one pick floor level and a second two of the charging stations in the array are located on a second pick floor level of the at least one pick floor level, the first two of the charging stations and the second two of the charging stations being vertically stacked one above the other.

14. The method of claim 9, further comprising reserving, with the controller, access to at least one of the at least one charging station by one of the at least one autonomous transport vehicles.

15. The method of claim 9, further comprising re-routing, with the controller, one of the at least one autonomous transport vehicles destined for a first charging station, of the at least one charging station, to a second charging station, of the at least one charging station, when the first charging station is inoperable.

16. A warehouse storage and retrieval system comprising:
  at least one autonomous transport vehicle;
  at least one transfer station having an allocated and unallocated state where in the allocated state the at least one transfer station allows transfer of items from and to the at least one autonomous transport vehicle;
  at least one charging station disposed on each of at least one pick floor level of the warehouse storage and retrieval system, the at least one charging station being located in communication with each respective one of the at least one transfer station and each of the at least one pick floor level including a transfer deck and a picking aisle in communication with the at least one charging station;
  at least one power supply configured to supply power to the at least one charging station; and
  a controller in communication with at least one of the at least one charging station and the at least one autonomous transport vehicle, where the controller is configured to
    communicate information related to interface between a predetermined at least one transfer station, of the at least one transfer station, and a predetermined one of the at least one autonomous transport vehicle,
    apply power from the at least one power supply to the at least one charging station for charging the at least one autonomous transport vehicle, wherein the controller supplies power to the at least one charging station to effect at least one of a quick charge and a full charge depending on identification of an unallocated time period of the at least one transfer station in the unallocated state.

17. The warehouse storage and retrieval system of claim 16, wherein the controller is configured to effect at least one of a quick charge and a full charge to both
the predetermined one of the at least one autonomous transport vehicle corresponding to the transfer of items with the predetermined one of the at least one autonomous transport vehicle transferring the items at the predetermined at least one transfer station when the predetermined at least one transfer station is in the allocated state, and
an idle automated transport vehicle at the at least one charging station when the predetermined at least one transfer station is in the unallocated state.

18. The warehouse storage and retrieval system of claim 16, wherein the at least one power supply is commonly connected to the at least one charging station of vertically adjacent ones of the at least one pick floor level.

19. The warehouse storage and retrieval system of claim 18, wherein the at least one charging station is commonly connected to the at least one power supply comprising a two by two array of charging stations where a first two of the charging stations in the array are located on a first pick floor level of the at least one pick floor level and a second two of the charging stations in the array are located on a second pick floor level of the at least one pick floor level, the first two of the charging stations and the second two of the charging stations being vertically stacked one above the other.

20. The warehouse storage and retrieval system of claim 16, wherein the controller is configured to access one or more of the at least one charging station by one of the at least one autonomous transport vehicles.

21. The warehouse storage and retrieval system of claim 16, wherein the controller is configured to re-route one of the at least one autonomous transport vehicle destined for a first charging station, of the at least one charging station, to a second charging station, of the at least one charging station, when the first charging station is inoperable.

* * * * *